United States Patent
Lane et al.

(10) Patent No.: US 12,158,006 B1
(45) Date of Patent: Dec. 3, 2024

(54) PET RAMP APPARATUS

(71) Applicant: Carlson Pet Products, Inc., Burnsville, MN (US)

(72) Inventors: Michael P. Lane, Chaska, MN (US); Mark A. Flannery, Longboat Key, FL (US)

(73) Assignee: Carlson Pet Products, Inc., Burnsville, MN (US)

( * ) Notice: Subject to any disclaimer, the term of this patent is extended or adjusted under 35 U.S.C. 154(b) by 214 days.

(21) Appl. No.: 17/681,687

(22) Filed: Feb. 25, 2022

(51) Int. Cl.
  *E04F 11/00* (2006.01)
  *A01K 29/00* (2006.01)

(52) U.S. Cl.
  CPC ............ *E04F 11/002* (2013.01); *A01K 29/00* (2013.01); *E04F 2011/005* (2013.01)

(58) Field of Classification Search
  CPC .. E04F 11/002; E04F 2011/005; A01K 29/00; A01K 15/027
  See application file for complete search history.

(56) References Cited

U.S. PATENT DOCUMENTS

| | | | | |
|---|---|---|---|---|
| 3,159,141 A | * | 12/1964 | Paterek | A01K 15/024 482/142 |
| D440,717 S | * | 4/2001 | Fazio | 119/706 |
| 6,345,950 B1 | * | 2/2002 | Gerwitz | B65G 69/30 14/71.1 |
| 6,968,810 B2 | * | 11/2005 | Bishop | A01K 1/035 119/847 |
| 7,621,236 B2 | * | 11/2009 | Steffey | A01K 1/035 182/180.1 |
| 8,117,994 B1 | * | 2/2012 | Goodlow | A01K 1/035 14/71.1 |
| D994,250 S | * | 8/2023 | He | D30/199 |
| 2020/0037582 A1 | * | 2/2020 | Caterson | A01K 29/00 |
| 2022/0251848 A1 | * | 8/2022 | Sweetnam | A01K 29/00 |

* cited by examiner

*Primary Examiner* — Mark R Wendell

(57) ABSTRACT

The present pet ramp apparatus includes a base, a ramp, and a support between the base and the ramp. The base and ramp are swingably engaged to each other. The support and ramp are swingably engaged to each other. The support is removably engaged to the base at spaced apart receptors, where changing the receptors changes the height of the upper end of the ramp and further changes the angle of inclination of the ramp.

20 Claims, 14 Drawing Sheets

PET RAMP APPARATUS

FIELD OF THE INVENTION

The present invention relates to an apparatus for a pet such as a small dog, particularly relates to a pet ramp apparatus that folds out into a pet ramp form to provide a means for a small dog to climb up to instead of jump up to, for example, the seating portion of a sofa, and further relates to such a pet ramp that is foldable to a compact form for storage under, for example, the sofa.

BACKGROUND OF THE INVENTION

Dogs love their humans unconditionally. Perhaps the only thing dogs love more is the sofa upon which their humans sit and sleep. Dogs will jump from slippery hardwood floors to the seating portion of a sofa. Dogs have no problems finding stepping stones up to the sofa cushions, such as first jumping onto a coffee table, and then onto a sofa end table, and finally onto his or her human sleeping on the sofa.

Dogs grow old. Dogs get cancer. Dogs suffer from joint issues such as arthritis. Dogs pass away. At some point in time, even the most hardened human will change the house rules, permit the most important creature to accompany the human on the sofa, and find a way to make it easy for the older or sick pup to get up on the sofa.

SUMMARY OF THE INVENTION

A feature of the present invention is a pet ramp apparatus between a lower surface and an upper location such that a pet may climb from the lower surface to the upper location and descend from the upper location to the lower surface, where the lower surface and upper location are disposed at different heights.

Another feature of the present invention is the provision in such a pet ramp apparatus, of a base, where the base includes a first base end and a second base end, where the first base end is disposable on the surface, and where the base includes spaced apart support receptors.

Another feature of the present invention is the provision in such a pet ramp apparatus, of a ramp, where the ramp includes a first ramp end and a second ramp end, where the first ramp end is disposable on the surface, where the second ramp end is disposable at the location, and where the ramp is swingably engaged to the base.

Another feature of the present invention is the provision in such a pet ramp apparatus, of a support between the base and the ramp, where the support includes a first support end and a second support end, where the support is swingably engaged to the ramp, where the support is removably engagable to the base at each of the spaced apart support receptors, and where each of the spaced apart support receptors provides a different angle of the ramp relative to the base when the support is engaged in such spaced apart support receptor.

Another feature of the present invention is the provision in such a pet ramp apparatus, of the second base end being swingably engaged to the ramp.

Another feature of the present invention is the provision in such a pet ramp apparatus, of the first support end being removably engagable in each of the spaced apart support receptors of the base.

Another feature of the present invention is the provision in such a pet ramp apparatus, of the second support end being swingably engaged to the ramp.

Another feature of the present invention is the provision in such a pet ramp apparatus, of the ramp including an interior, and where, after the support is removably engaged from the base, each of the base and support are swingable into the interior of the ramp.

Another feature of the present invention is the provision in such a pet ramp apparatus, of the base including an axis, and where at least two of such spaced apart support receptors are disposed at an oblique angle relative to the axis of the base.

Another feature of the present invention is the provision in such a pet ramp apparatus, of, when the support is engaged to one of the spaced apart support receptors that is disposed obliquely relative to an axis of the base, the base and ramp are disposed obliquely relative to each other.

Another feature of the present invention is the provision in such a pet ramp apparatus, of the ramp including a direction of travel from the first ramp end to the second ramp end, where the ramp further includes transverse members extending transversely relative to the direction of travel, and where the base includes a transverse member receptor for receiving one of the transverse members when the base, support, and ramp are swung together.

Another feature of the present invention is the provision in such a pet ramp apparatus, of the support including a transverse member receptor for receiving one of the transverse members when the base, support, and ramp are swung together.

Another feature of the present invention is the provision in such a pet ramp apparatus, of the base including first and second side base members and an end base member engaged between the first and second side base members, where each of the first and second side base members is swingably engaged to the ramp, where the first and second side base members include the spaced apart support receptors, where each of the spaced apart support receptors of the first side base member is matched with and transversely opposes a spaced apart support receptor of the second side base member.

Another feature of the present invention is the provision in such a pet ramp apparatus, of the base including first and second side base members and an end base member engaged between the first and second side base members, where each of the first and second side base members is swingably engaged to the ramp, where the first and second side base members include the spaced apart support receptors, where each of the spaced apart support receptors is defined by an upper opening, a closed outer wall, a side opening opposite of the closed outer wall, and a closed bottom end.

Another feature of the present invention is the provision in such a pet ramp apparatus, of the base including first and second side base members and an end base member engaged between the first and second side base members, where each of the first and second side base members is swingably engaged to the ramp, where each of the first and second side base members includes a transverse member receptor for receiving one of the transverse members when the base, support, and ramp are swung together, and where each of the transverse member receptors is defined by an upper opening, two side openings opposite of each other, and a closed bottom end.

Another feature of the present invention is the provision in such a pet ramp apparatus, of the base being swingably engaged to the ramp between the first ramp end and the second ramp end.

Another feature of the present invention is the provision in such a pet ramp apparatus, of the support including first and second side support members and an end support member, and where each of the first and second side support members includes a transverse member receptor for receiving one of the transverse members when the base, support, and ramp are swung together.

Another feature of the present invention is the provision in such a pet ramp apparatus, of the support including first and second side support members and an end support member, where each of the first and second side support members is disposed inwardly of outermost sidewalls of the ramp, and where each of the first and second side support members is disposed inwardly of outermost side base members of the base.

Another feature of the present invention is the provision in such a pet ramp apparatus, of the support including first and second side support members and an end support member, where the end support member includes first and second opposing ends, where the first opposing end extends outwardly of an outermost side surface of the first side support member, where the second opposing end extends outwardly of an outermost side surface of the second side support member, and where each of the first and second opposing ends engages one of the spaced apart support receptors.

Another feature of the present invention is the provision in such a pet ramp apparatus, of the support including first and second side support members and an end support member, where each of the first and second side support members is swingably engaged to a transverse piece on the ramp, where the transverse piece is disposed transversely relative to a direction of travel from the first ramp end to the second ramp end, where the transverse piece includes first and second ends that terminate short of outermost sides of the ramp, where the first side support member is swingably engaged to the first end of the transverse piece, and where the second side support member is swingably engaged to the second end of the transverse piece.

Another feature of the present invention is the provision in such a pet ramp apparatus, of the ramp including first and second side members and a ramp plate between the first and second side members, where the first side member includes a first periphery, where the second side member includes a second periphery, where the ramp plate is engaged to a first innermost side of the first side member within such first periphery, and where the ramp plate is engaged to a second innermost side of the second side member within such second periphery.

Another feature of the present invention is the provision in such a pet ramp apparatus, of the ramp including first and second side members and a ramp plate between the first and second side members, and of the ramp further including a set of transverse members engaged between the first and second side members, where the ramp plate is on each of the transverse members.

Another feature of the present invention is the provision in such a pet ramp apparatus, of, when the pet ramp apparatus is in use between the surface and the location, the base makes contact with the surface at two locations and all other portions of the base are spaced from the surface.

Another feature of the present invention is the provision in such a pet ramp apparatus, of, when the pet ramp apparatus is in use between the surface and the location, the ramp makes contact with the surface at two locations and all other portions of the ramp are spaced from the surface.

Another feature of the present invention is the provision in such a pet ramp apparatus, of, when the pet ramp apparatus is in use between the surface and the location, all portions of the support are spaced from the surface.

Another feature of the present invention is the provision in such a pet ramp apparatus, of the support including first and second side support members and an end support member engaged between the first and second side support members, of the base including first and second side base members and an end base member engaged between the first and second side base members, and of the ramp including first and second side outermost members, where the first and second side base members of the base are disposed inwardly of first and second outermost members of the ramp, and where the first and second side support members of the support are disposed inwardly of first and second side base members of the base.

An advantage of the present pet ramp apparatus is that it includes multiple forms. For example, the pet ramp apparatus includes an operational, folded out form and a compact, folded in form. The operational, folded out form includes a state where the ramp inclines relatively steeply, a state where the ramp inclines at a relatively minimal slope, and intermediate states where the ramp inclines at slopes greater than the minimum slope, with each state providing an upper ramp end with a different height.

Another advantage of the present pet ramp apparatus is that it is safe. For example, in the operational, folded form, at any slope or angle, the ramp is sturdy from its lower end to its upper end.

Another advantage of the present pet ramp apparatus is that it is aesthetic. The present ramp apparatus may be formed almost entirely from wood or a wood product.

Another advantage of the present pet ramp apparatus is that it may be shipped in the compact, folded in form and, without assembly, immediately folded out to the operational, folded out form.

Another advantage of the present pet ramp apparatus is that it is simple and user friendly. For example, to set up the pet ramp apparatus, there is only one piece (the support) that is moved to engage another piece (the base). When the pet ramp apparatus is taken down after use, there is again only one piece (the support) that is moved to be disengaged from another piece (the base). Further, during the folding in process, the base naturally receives without user intervention a transverse support of the ramp, the support naturally receives without user intervention a transverse support of the ramp, and the base naturally receives without user intervention an end or transverse member of the support.

DESCRIPTION

Figure 1:
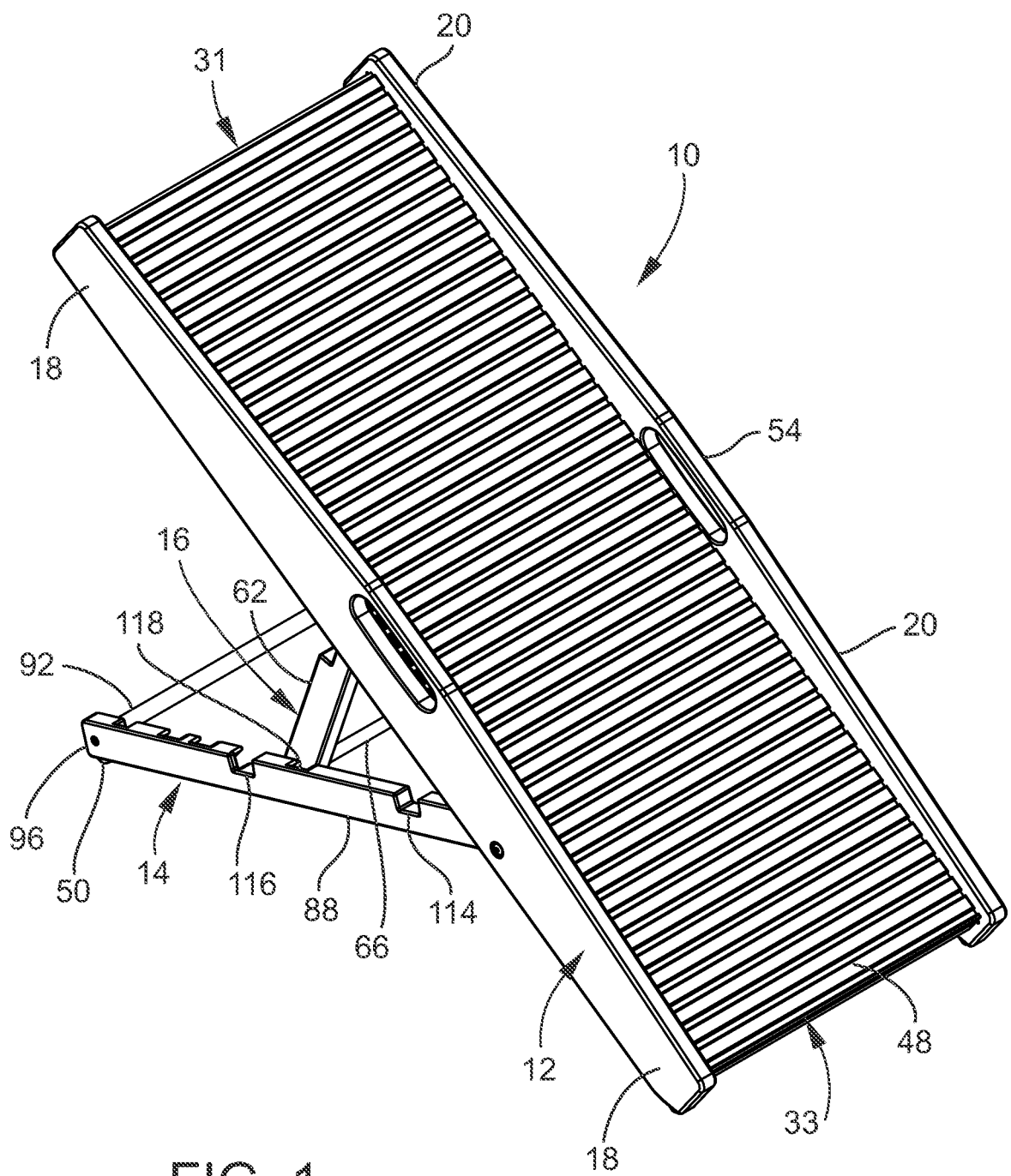
FIG. 1 is a front perspective view of the pet ramp apparatus in the operational, folded out form.
Figure 2:
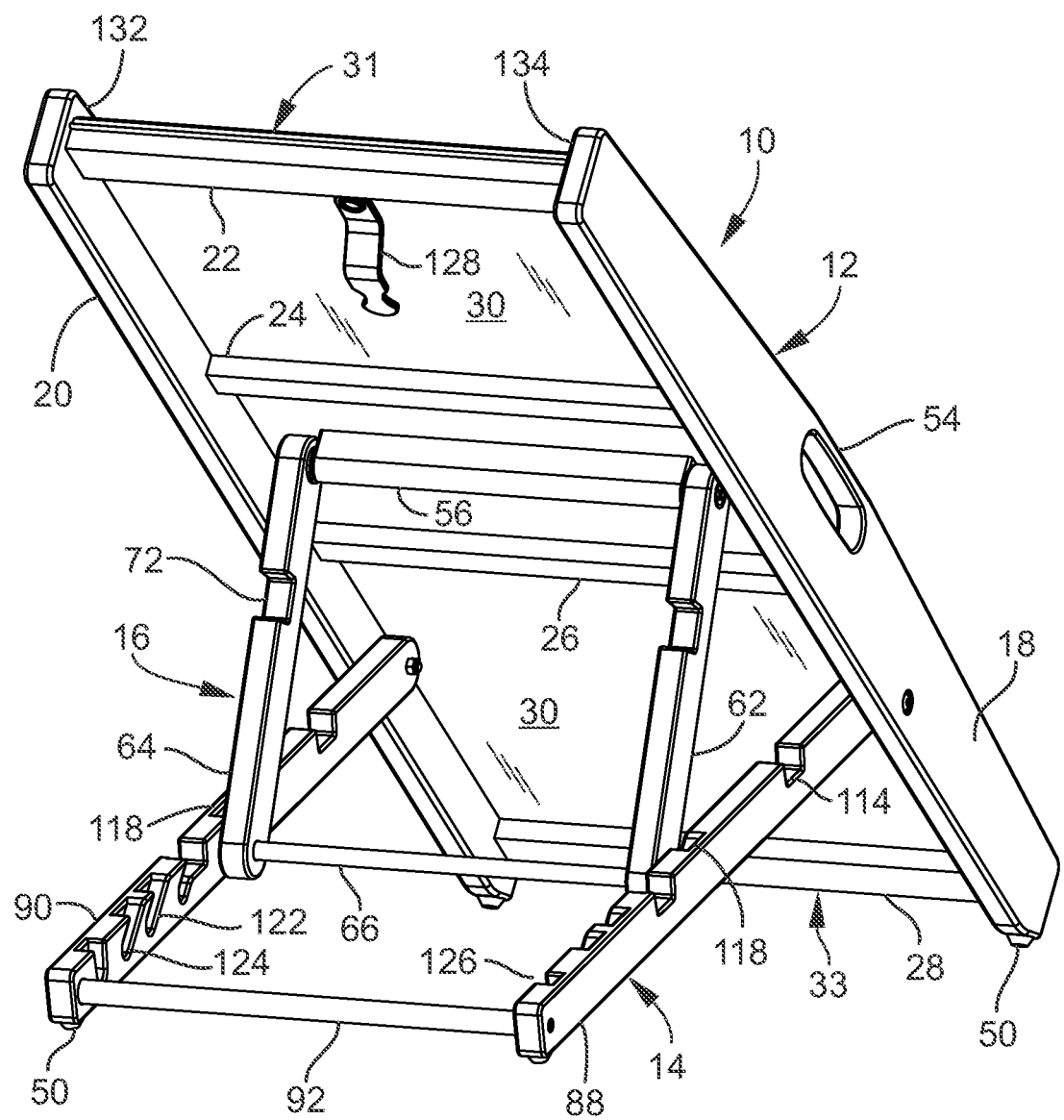
FIG. 2 is a rear perspective view of the pet ramp apparatus of FIG. 1 and also shows the pet ramp apparatus in the operational, folded out form.

As shown in FIGS. 1 and 2, the present pet ramp apparatus is indicated by reference number 10. Pet ramp apparatus 10 includes a ramp 12, a base 14, and a support 16.

Ramp 10 includes a first side member 18 and a second side member 20 spaced apart and tied together by first, second, third, and fourth transverse support members 22, 24, 26, 28. The first and second side members 18, 20 are further spaced apart and tied together by a relatively large piece or plate 30. Transverse support members 22, 24, 26, 28 and piece 30 run to and between and are engaged by inner faces or sides of the first and second side members 18, 20. Piece or plate 30 is engaged on top of each of the transverse support members 22, 24, 26, 28. Piece or plate 30 is engaged on the top face of each of the transverse support members 22, 24, 26, 28. Each of the transverse support members 22, 24, 26, 28 includes a top face, a bottom face opposing the top face, first and second side faces opposing each other, and end faces, where one end face abuts the inner side of first side member 18 and where the other end face abuts the inner side of second side member 20.

Transverse support member 22 is disposed at an upper end 31 of the ramp 12 when the ramp 12 is in the operational and folded out position. Transverse support member 28 is disposed at a lower end 33 of the ramp 12 when the ramp 12 is in the operational and folded out position.

First and second side members 18, 20 run parallel to each other. Each of the first and second side members 18, 20 defines a plane, with such planes being parallel to each other. Such planes are vertical relative to a surface on which the pet ramp apparatus 10 stands when the pet ramp apparatus 10 is in the operational and folded out position, where such standing position is provided by two bottom locations of the ramp 12 and two bottom locations of the support 14.

The transverse support members 22, 24, 26, 28 extend at right angles to the side support members 18, 20. The transverse support members 22, 24, 26, 28 are parallel to each other.

Figure 11A:
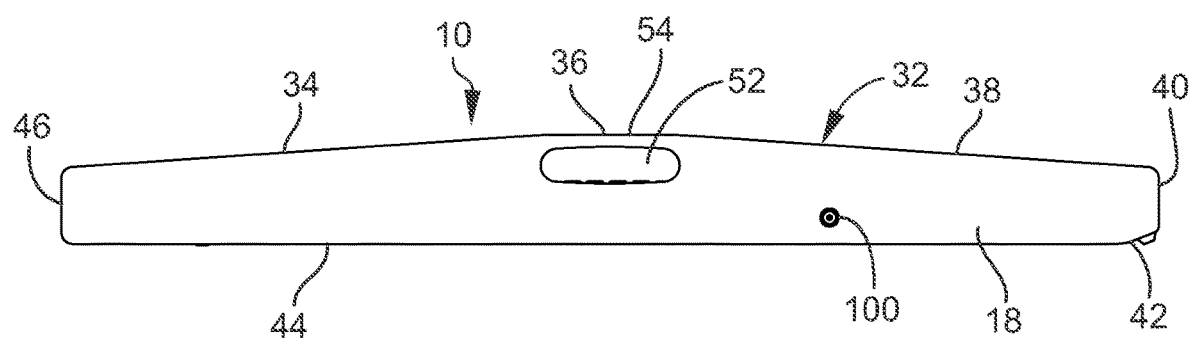
FIG. 11A is a side view of the pet ramp apparatus of FIG. 10B.
Figure 11B:
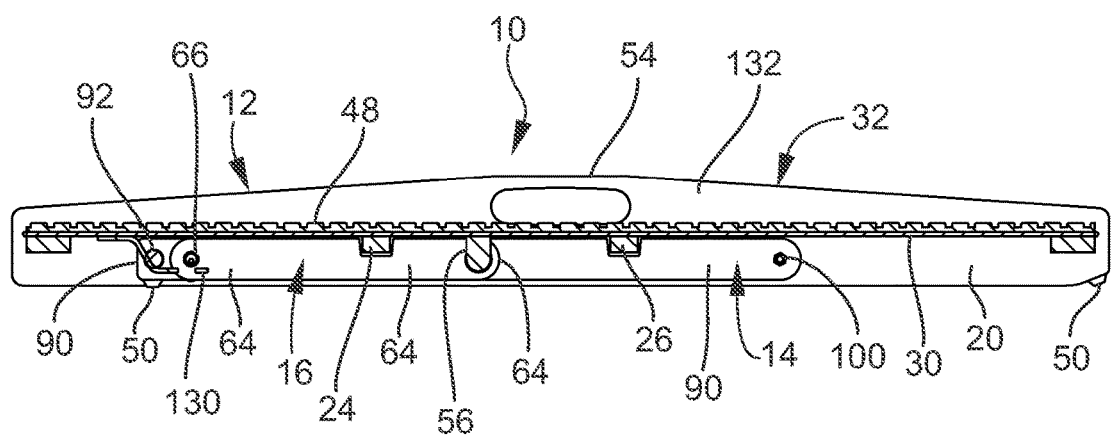
FIG. 11B is a section view of the pet ramp apparatus of FIG. 10B.

As shown in FIGS. 11A and 11B, each of the side members 18, 20 includes a periphery 32. Periphery 32 includes a periphery portion 34 that leads into a periphery portion 36 that leads into a periphery portion 38 that leads into a periphery portion 40 that leads into a periphery portion 42 that leads into a periphery portion 44 that leads into a periphery portion 46 that in turn leads into periphery portion 34. Periphery portions 34, 38 extend inwardly and upwardly. Periphery portion 36 extends horizontally when periphery portion 44 is on a horizontal surface. Periphery portion 44 also extends horizontally when periphery portion 44 is on a horizontal surface. Periphery portions 40, 46 are side periphery portions. Periphery portion 42 is a corner periphery portion. The junction of periphery portions 44, 46 is rounded. The junction of periphery portions 46, 34 is rounded. The junction of periphery portions 38, 40 is rounded. The junction of periphery portions 40 and 42 is rounded. The junction of periphery portions 42, 44 is rounded.

End edges of the piece or plate 30 are contained within and spaced from the periphery 32 of each of the side members 18, 20. End portions of each of the transverse support members 22, 24, 26, 28 are contained within and spaced from the periphery 32 of each of the side members 18, 20. A textile piece 48 is engaged on the upper face of piece or plate 30 and end edges of the textile piece 48 are contained within and spaced from the periphery 32 of each of the side members 18, 20.

The periphery 32 of side member 18 and the periphery 32 of side member 20 in combination define an imaginary box or interior of the pet ramp apparatus 10. Piece or plate 30 is in such interior and spaced from the boundaries of such imaginary box. The textile piece 48 is in such interior and spaced from the boundaries of such imaginary box. Transverse support members 22, 24, 26, 28 are in such interior and spaced from the boundaries of such imaginary box. Support 16 is in such interior and spaced from the boundaries of such imaginary box when the pet ramp apparatus 10 is in the compact and folded in position. Base 14, except for a lower face portion of resilient feet 50, is in such interior and spaced from the boundaries of such imaginary box when the pet ramp apparatus 10 is in the compact and folded in position.

Each of the side members 18, 20 includes a through slot 52. Slot 52 is spaced from and adjacent to periphery portion 36. Slot 52 is disposed equidistance from the ends of the side members 18, 20 where such ends are defined by the periphery portions 40, 46. The side member portion between slot 52 and periphery portion 36 may be referred to as a handle 54.

Piece or plate 30 extends from an end portion of the side members 18, 20 to the other end portion of the side members 18, 20 and further extends from the inner face of side member 18 to the inner face of side member 20. Piece or plate 30 is a wood or wood product. Piece or plate 30 along with transverse support members 22, 24, 26, 28 are of sufficient strength to withstand and not break under the weight of a large Labrador Retriever dog when the pet ramp apparatus 10 is in either the operational and folded out position or the compact folded in position.

It should be noted that peripheral edge portions 34, 38 rise inwardly and upwardly relatively slowly and gradually so as to provide for a space for slot 52 and handle 54. At the same time the slow and gradual rise of peripheral edge portions 34, 38 minimize the profile or height of the side members 18, 20 to keep the overall height of the pet ramp apparatus 10 low to keep the pet ramp apparatus 10 compact so as to occupy a minimum amount of space on store shelves, in shipping boxes and for sliding under sofas having minimal under space. At the same time, peripheral portions 34, 36, 38 provide guard rails for the feet of pets and further provide a line of sight for the pets as they travel up and down the pet ramp apparatus 10.

Each of the corner periphery portions 42 includes a resilient foot 50. Resilient foot 50 is formed of a non-skid material such as a rubber or elastomer. Resilient foot is engaged to the corner periphery portions 42 with a pin connector 51, as shown in FIG. 3.

Figure 14A:
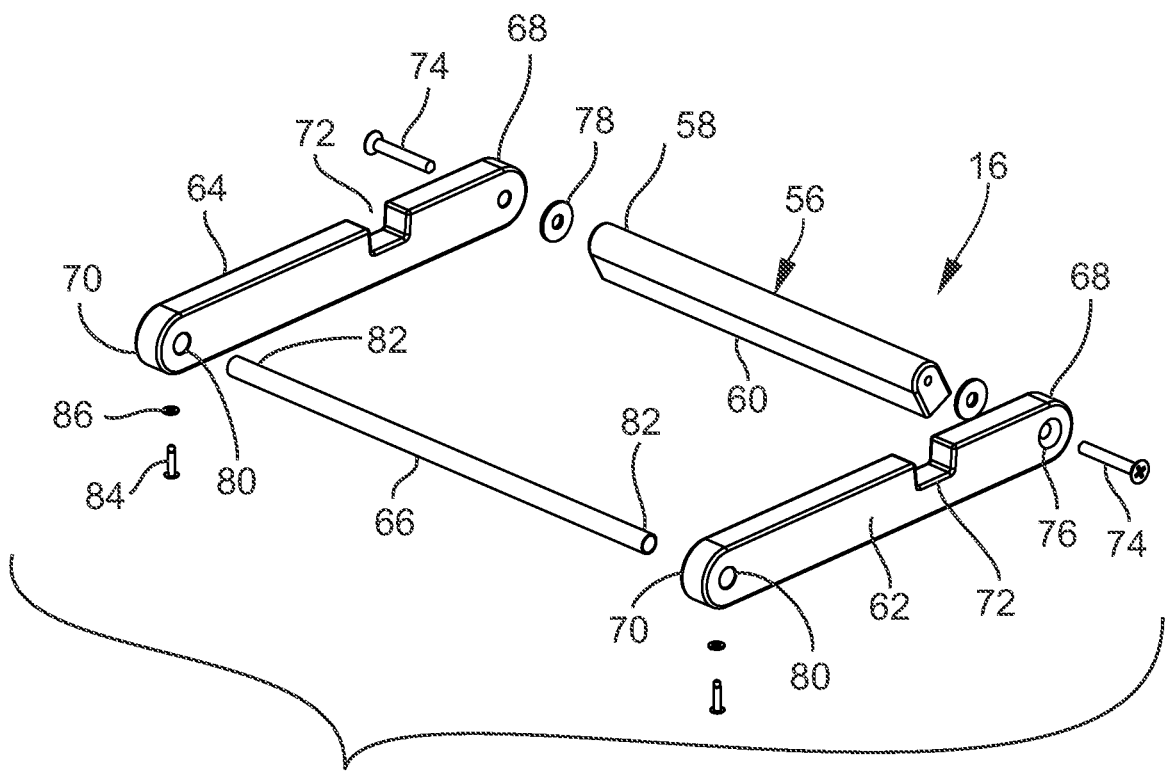
FIG. 14A is a perspective exploded view of the support of the pet ramp apparatus of FIG. 2.
Figure 14B:
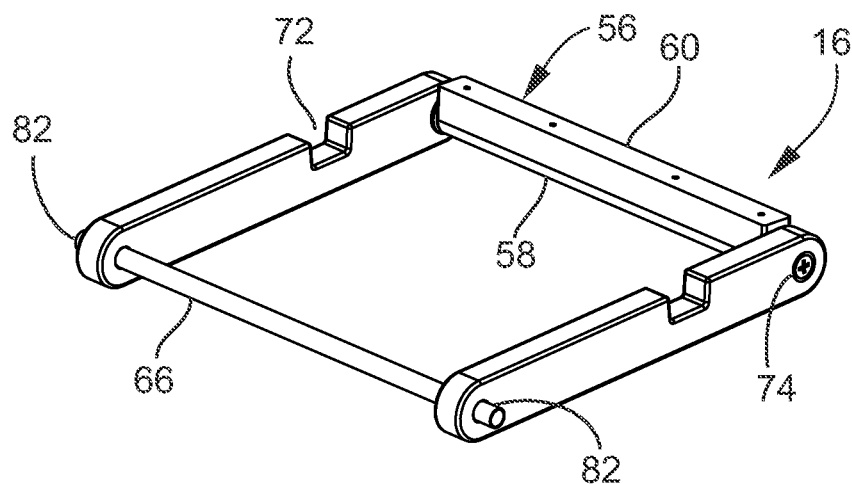
FIG. 14B is a perspective assembled view of the support of the pet ramp apparatus of FIG. 2.

As shown in FIG. 2, ramp 12 further includes a transverse piece 56 engaged to the piece or plate 30 and extending from the underside of piece or plate 30. Outer ends of the transverse piece 56 are spaced from the side members 18, 20 of the ramp 12. Transverse piece 56 extends in the direction from one side member 18 to the other side member 20. Transverse piece 56 extends parallel to each of transverse support members 22, 24, 26, 28. As shown in FIGS. 14A and 14B, transverse piece 56 includes a cylindrical portion 58 and a parallelepiped portion 60. The parallelepiped portion 60 is adjacent to the piece or plate 30 and is engaged to the underside of the piece or plate 30 with pins or pin connectors. Cylindrical portion 58 is spaced from the piece or plate 30 and is received by the base 14 when the pet ramp apparatus 10 is in the compact and folded in position. Cylindrical portion 58 and parallelepiped portion 60 are one-piece and integral with each other.

Support 16 is swingably engaged to the ramp 12 via the transverse piece 56. Support 16 includes a first side support member 62, a second side support member 64, and an end support member 66. Each of the first and second side support members 62 includes a rear end 68, a front end 70, and a receptor 72. Receptor 72 is a notch that receives transverse member 24 when the pet ramp apparatus 10 is folded in to its compact folded in state. First and second side support members 62, 64, and end support member 66 form the shape of a U. To provide for such swinging, pin connectors 74 engage counter-sunk holes 76 in the rear ends 66 of first and second side support members 62, 64 and further engage pin connector holes in the ends of the cylindrical portion 58 of the transverse piece 56. Washers 78 ride on the pin connectors 74 between the outer ends of the transverse piece 56 and the inner faces of the rear ends 68 of the first and second side support members 62, 64. Each of the front ends 70 of the side support members 62, 64 includes a through hole 80 for receiving therethrough outer end portions 82 of the end support member 66. End portions 82 extend beyond outer faces of the first and second side support members 62, 64. End support member 66 is cylindrical and its end portions 82 are also cylindrical. End support member 66 is a cylindrical rod. Pin connectors 84 are engaged in the front ends 70 of the side support members 62, 64 to further engage the end support member 66 to fix the end support member 66 against rotation or axial movement. Washers 86 ride on the pin connectors 84 between the head of the pin connector 84 and the front end 70 of the side support members 62, 64. Side support members 62, 64 are straight and each includes a straight axis. Rear ends 68 and front ends 70 of the side support members are rounded or curved. Each of the outer and inner faces of the side support members 62, 64 defines a flat plane. Each of the lower faces of the side support members 62, 64 defines a flat plane. Except for the dependence of notches 72, each of the upper faces of the side support members 62, 64 defines a flat plane. Each of the outer faces of end support member 66 defines a flat plane.

Figure 3:
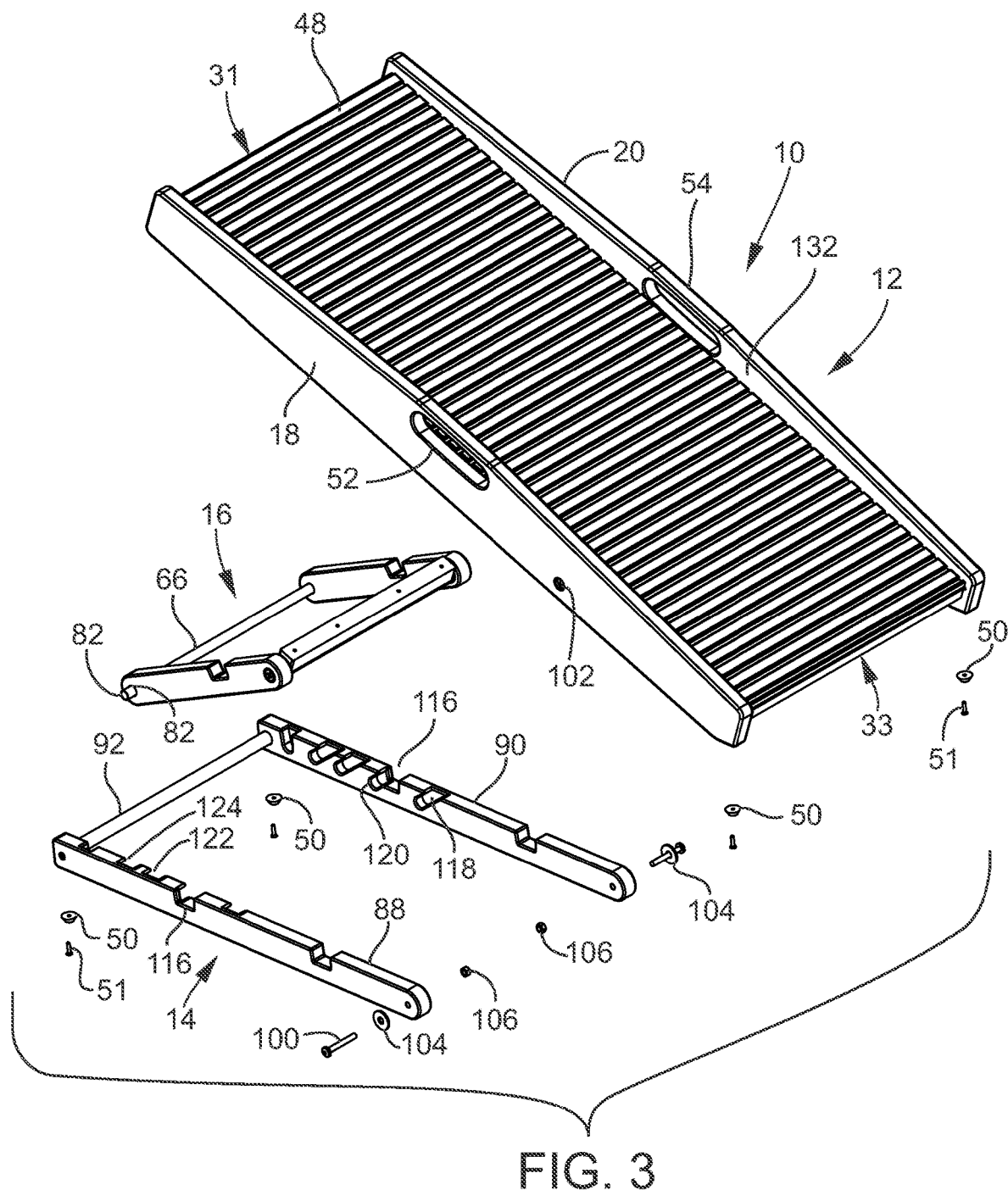
FIG. 3 is a perspective exploded view of the pet ramp apparatus of FIG. 1.
Figure 13A:
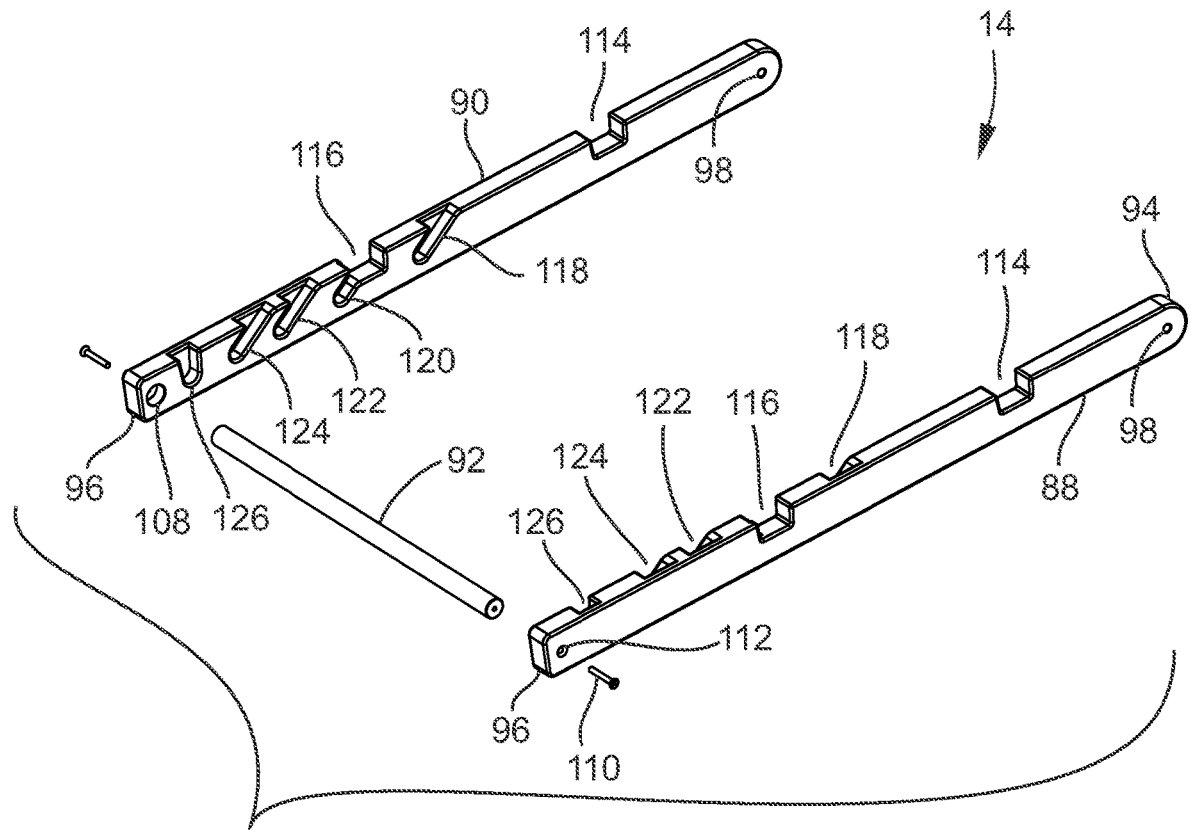
FIG. 13A is a perspective exploded view of the base of the pet ramp apparatus of FIG. 2.
Figure 13B:
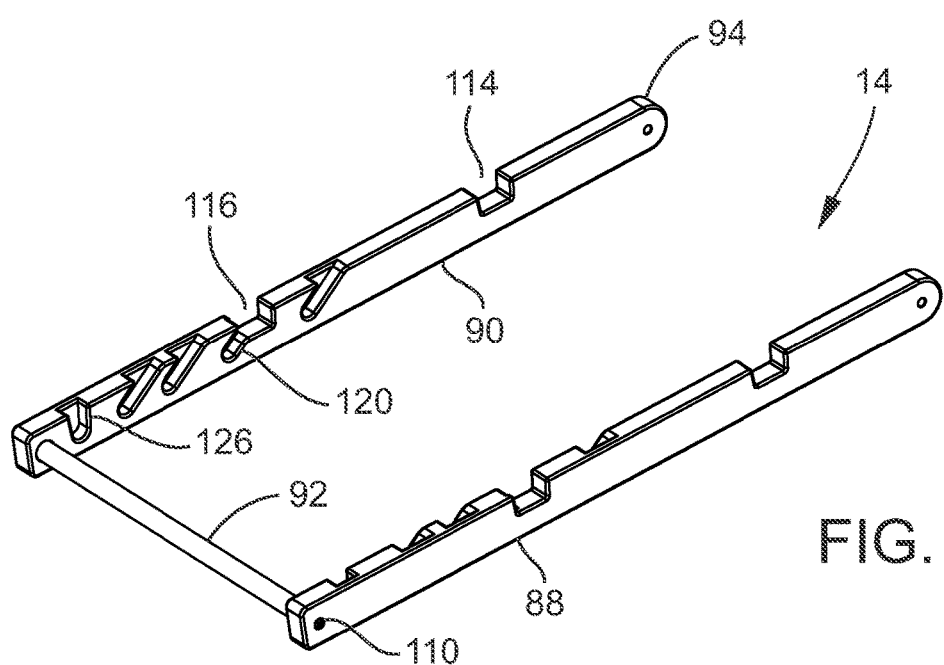
FIG. 13B is a perspective assembled view of the base of the pet ramp apparatus of FIG. 2.

Base 14 is shown in FIGS. 3, 13A and 13B. Base 14 is swingably engaged to ramp 12. Base 14 includes a first side base member 88, a second side base member 90, and an end base member 92. Each of the first side base member 88 and second side base member 90 includes a rear end 94 and a front end 96. Each of the rear ends 94 includes a pin connector hole 98 for reception therein of a pin connector 100. Pin connectors 100 engage pin connector holes 102 formed in ramp side members 18, 20 and then engage pin connector holes 98 in the rear ends 94 of the base 14. Washers 104 ride on pin connectors 100 between the inner faces of side base members 18, 20 of ramp 12 and the outer faces of side base members 88, 90 of the base 14. Nuts such as lock nuts engage the inner ends of pin connectors 100 at the inner faces of side base members 88, 90 of the base 14. Base 14 is U-shaped. The front ends 96 of the side base members 88, 90 are tied together by the end base member 92. End base member 92 is cylindrical and is received in cylindrical sockets 108 opening to the inner face of side base members 88, 90. At the front ends 96 of the side base members 88, 90, pin connectors 110 are received in pin connector holes 112 and then engage pin connector holes in the outer ends of cylindrical end base member 92. Each of the side base members 88, 90 includes a first notch 114 that receives transverse support member 26 of the ramp 12. Each of the side base members 88, 90 includes a second notch 116 that receives transverse support member 24 of the ramp 12. Each of the side base members 88, 90 includes first, second, third, and fourth receptors 118, 120, 122, 124 for receiving outer ends 82 of the cylindrical end support member 66. When outer ends 82 are in the first receptors 118, the ramp 12 is at its steepest or greatest angle. When outer ends 82 are in the second receptors 120, the ramp 12 is at its second most great angle. When outer ends 82 are in the third receptors 120, the ramp 12 is at its third most great angle, which angle is less than the second most great angle. When outer ends 82 are in the fourth receptors 120, the ramp 12 is at its fourth most great angle or its lowest angle. Receptors 118, 122, and 124 open inwardly and further open upwardly and obliquely when the base 14 is in a horizontal position such as in the compact folded in position for storage. When the base 14 is in such horizontal position, each of receptors 118, 122, and 124 includes an oblique floor that extends upwardly and rearwardly to the top face of the respective side base member 88, 90. When the base 14 is in such horizontal position, each of the receptors 118, 122, and 124 includes an oblique ceiling that extends upwardly and rearwardly to the top face of the respective side base member 88, 90. Each of the receptors 118, 122, and 124 includes an opening at the top face of the respective side base member 88, 90. Each of the receptors 118, 122, 124 are open on the inner side of the respective side base member 88, 90. Each of the receptors 118, 122, 124 are closed on the outer side of the respective side base member 88, 90. Receptors 118, 122, 124 are oblique receptors relative to the upper and lower faces of the respective side base member 88, 90.

Receptor 120 is a special case. Receptor 120 communicates with notch 116. Receptor 120 opens into notch 116. When the base 14 is in a horizontal position such as in the compact folded in position for storage, receptor 120 includes an oblique floor and an oblique ceiling. Receptor 120 is an oblique receptor relative to the upper and lower faces of its respective side base member 88, 90. Receptor 120 includes a closed outer side. Receptor 120 includes an open inner side. Outer ends 82 of cylindrical end support member 66 first travel into notch 116 and then travel into receptor 120.

Receptor 126 is another special case. Receptor 126 is a U-shaped recess. Receptor 126 includes a closed outer side and an open inner side. Receptor 126 extends vertically downwardly from the top face of side base members 88, 90 when the base 14 is in a horizontal state such as when the pet ramp apparatus 10 is in the compact folded in position. Receptor 126 receives the cylindrical end support member 66 of the support 16 when the pet ramp apparatus 10 is in the compact folded in position.

FIGS. 1 and 2 show the ramp 12 in the most steep position where the outer ends 82 of the support 16 are engaged in receptors 118. Front ends 96 of the side base members 88, 90 engage a surface via a resilient foot 50 engaged thereto. Corner portions 42 of the ramp side members 18, 20 also engage the same surface via resilient feet 50. Feet 50 are engaged to the front ends 96 and corner portions 42 with pin connectors 51. The remaining portions of the ramp 12 and base 14 are spaced from such surface. All portions of support 16 are spaced from such surface. FIG. 1 shows an operational and folded out form of the pet ramp apparatus 10. In such form, the ramp 12 is fixed against pivoting or swinging by the support 16 engaging the base 14. The width of support 16 that is defined by the distance between the outer faces of the side support members 62, 64 is about the same as the distance between the inner faces of the side base members 88, 90 such that lateral or side to side movement of the support 16 relative to the base 14 is minimized. The width of base 14 that is defined by the distance between outer faces of the side base members 88, 90 is about the same as the distance between the inner faces of the ramp side members 18, 20 such that lateral or side to side movement of the base 14 is minimized.

Figure 12A:
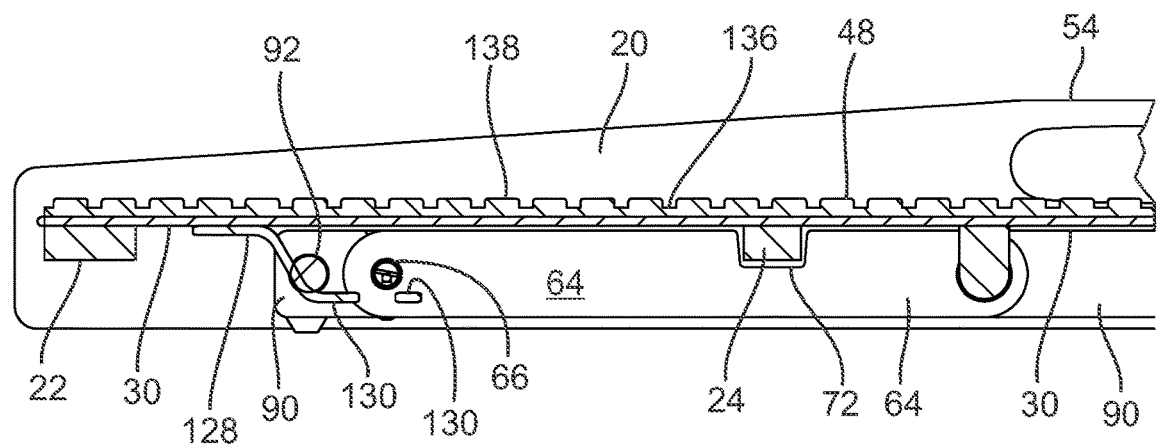
FIG. 12A is a detail view of a portion of the pet ramp apparatus of FIG. 11B.

FIG. 2 further shows an S-shaped pivoting or swing lock 128. The swinging lock 128 is pivotally engaged to the piece or plate 30. The swinging lock 128 extends away from the plane of the piece or plate 30 such that a distal end portion 130 is spaced from the piece or plate 30. As shown in FIGS. 10B, 11B, and 12A, the distal end portion 130 of the swinging lock 128 engages the cylindrical end member 92 of the base 14 and further engages the cylindrical end member 66 of the support 16 when the pet ramp apparatus 10 is in the compact folded in position to keep the base 14 and support 16 adjacent to the piece or plate 30 and to prevent the base 14 and support 16 from swinging out of the interior of the pet ramp apparatus 10 when the pet ramp apparatus 10, in its compact folded in position, is picked up and moved from place to place. In such a retaining position, the swinging lock 128 traverses the cylindrical end members 92, 66. When the pet ramp apparatus 10 is to be set up, the swinging lock 128 is pivoted to an out-of-the-way position to where the distal end portion 130 is adjacent to transverse support member 22 and parallel to the cylindrical end members 92 and 66.

FIG. 3 is an exploded view of the pet ramp apparatus 10. FIG. 3 shows in perspective the ramp 12, support 16, and base 14.

Figure 4:
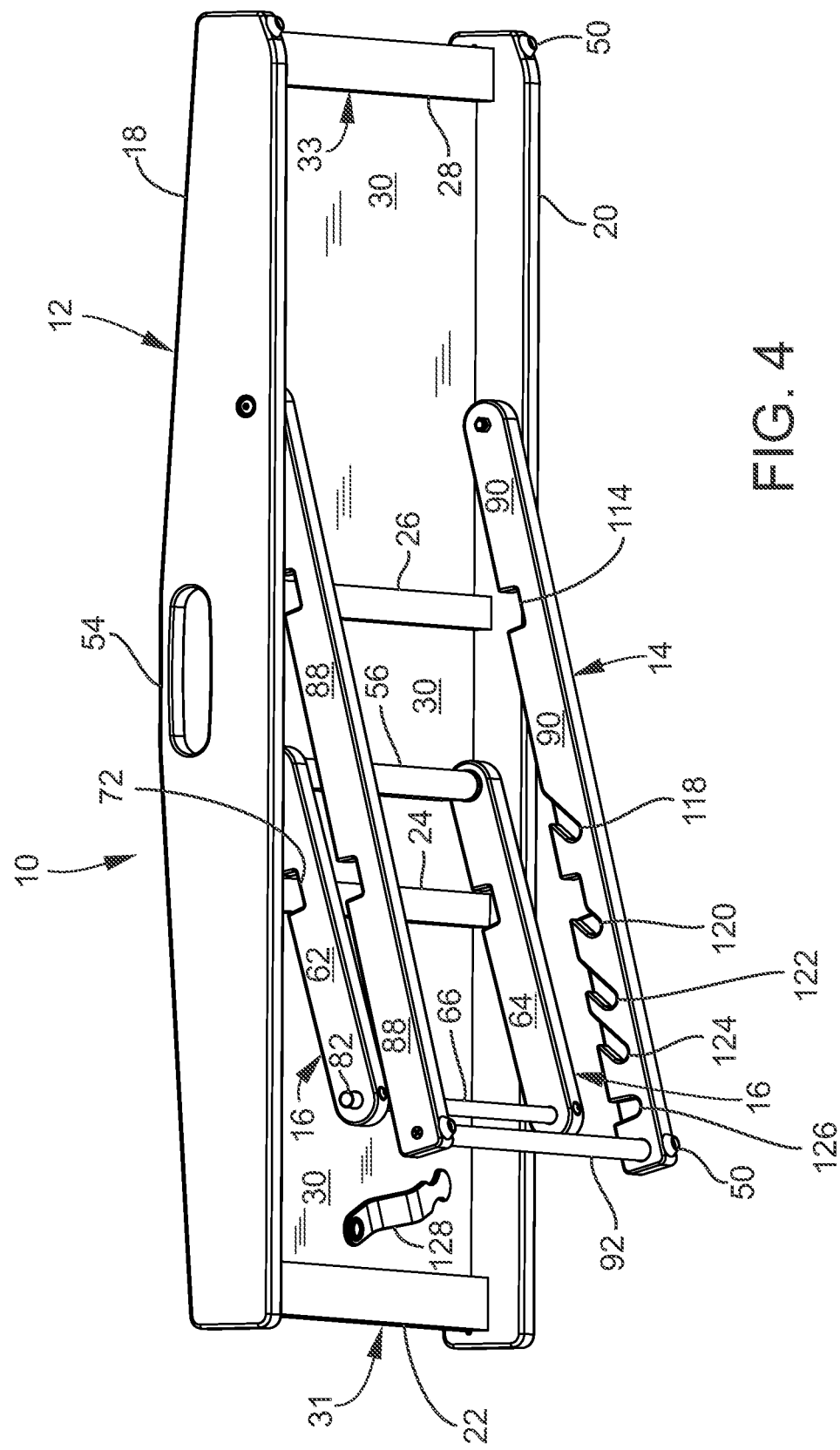
FIG. 4 is a bottom perspective view of the pet ramp apparatus of FIG. 1 in the process of being folded in from an operational folded out form to a compact folded in form for storage.

FIG. 4 shows the pet ramp apparatus 10 in the process of being folded from the compact folded in position to the operational folded out position. FIG. 4 may also be described as showing the pet ramp apparatus 10 in the process of being folded from the operational folded out position to the compact folded in position. FIG. 4 further shows that the end edges of the transverse member 28 are spaced from the end edges of the side members 18, 20 of the ramp 12. FIG. 4 further shows that the end edges of the transverse member 22 are spaced from the end edges of the side members 18, 20 of the ramp 12.

FIG. 4 shows the notches 114 of the base side members 88, 90 about to receive transverse member 26. FIG. 4 shows the notches 72 of the side support members 62, 64 of the support 16 in the process of receiving transverse member 24.

FIG. 4 shows that the piece or plate 30 is engaged to ramp side member 20 along the entire longitudinal length of one of the outer edges of the piece or plate 30. The other outer edge is engaged along its entire longitudinal length to ramp side member 18.

Figure 5A:
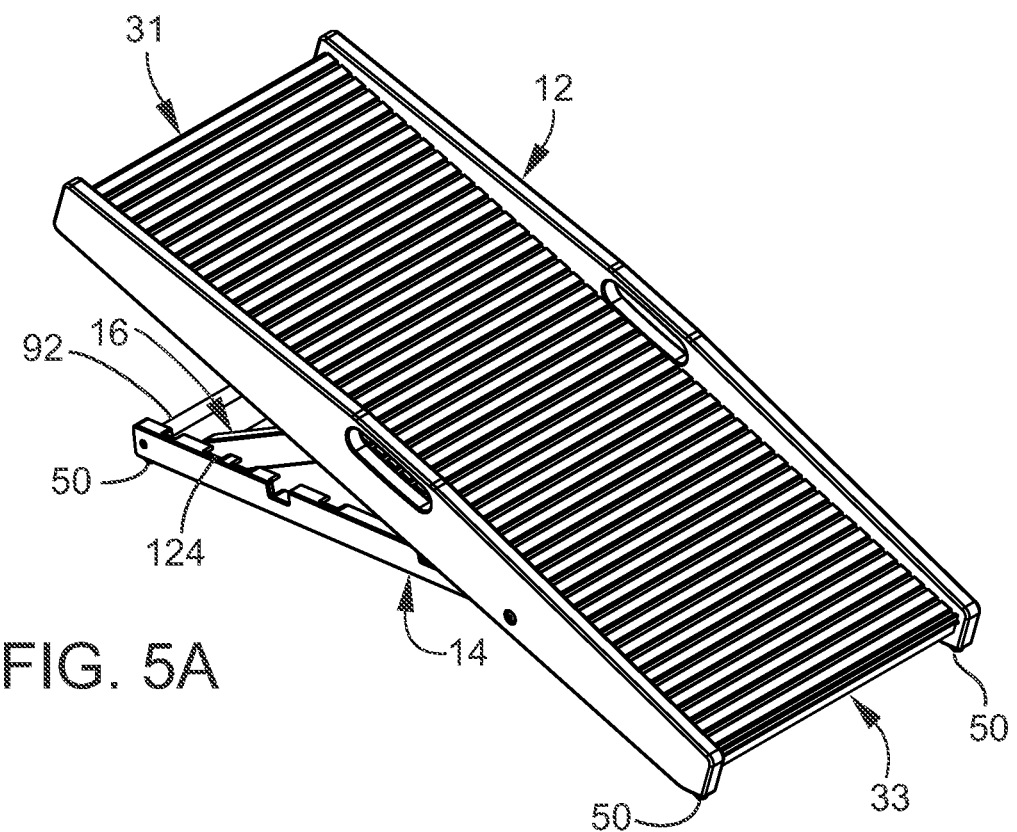
FIG. 5A is a front perspective view of the pet ramp apparatus of FIG. 1 where the slope of the ramp is at its minimum degree.

FIG. 5A shows that the outer ends 82 of the end support member 66 are set or engaged in oblique receptors or oblique receptor slots 124 of the base 14.

Figure 5B:
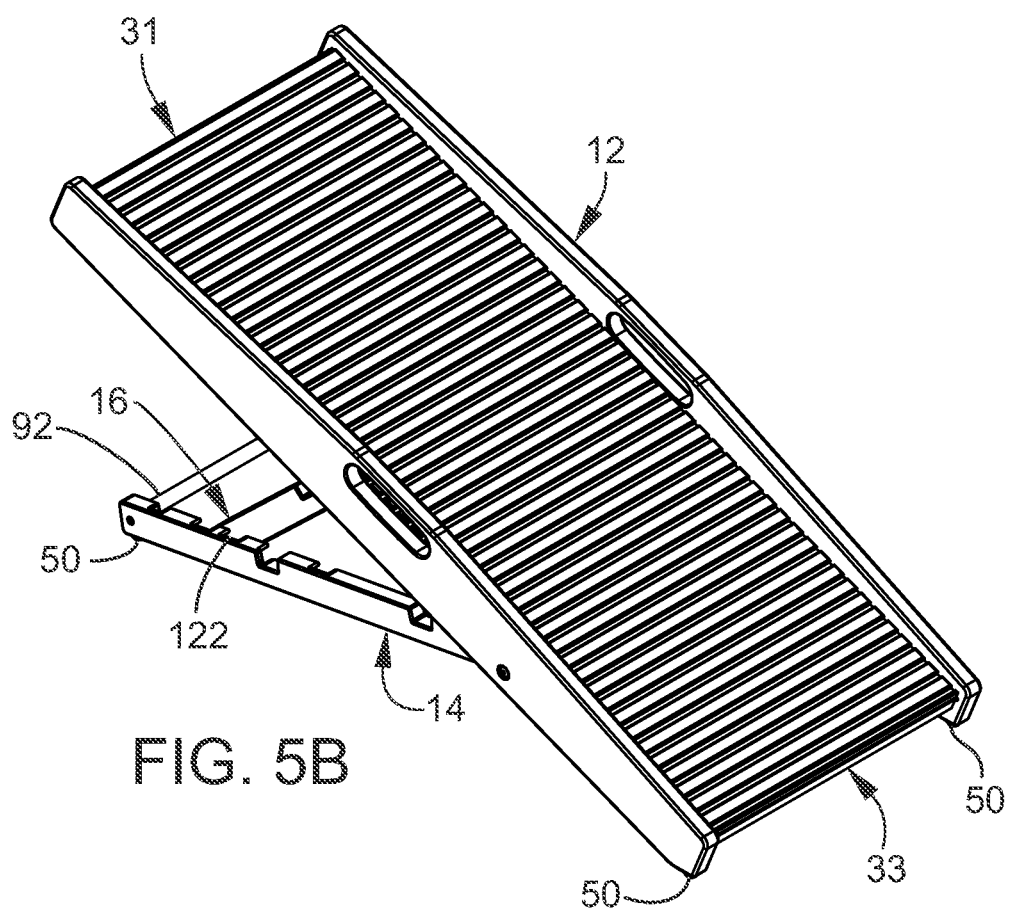
FIG. 5B is a front perspective view of the pet ramp apparatus of FIG. 1 where the slope of the ramp is at an intermediate degree and is greater than the slope shown in FIG. 5A.

FIG. 5B shows that the outer ends 82 of the end support member 66 are set or engaged in oblique receptors or oblique receptor slots 122 of the base 14.

Figure 6A:
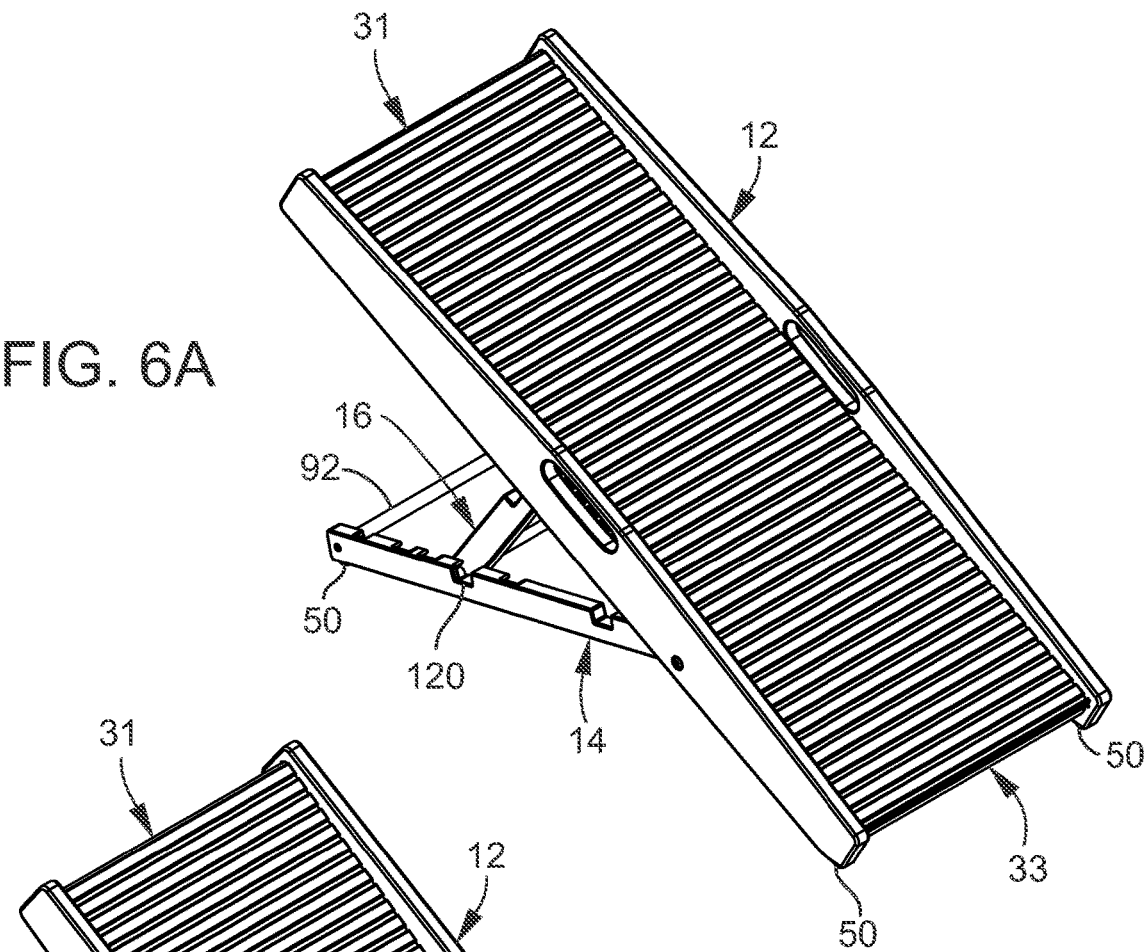
FIG. 6A is a front perspective view of the pet ramp apparatus of FIG. 1 where the slope of the ramp is at an intermediate degree and is greater than the slope shown in FIG. 5B.

FIG. 6A shows that the outer ends 82 of the end support member 66 are set or engaged in oblique receptors or oblique receptor slots 120 of the base 14.

Figure 6B:
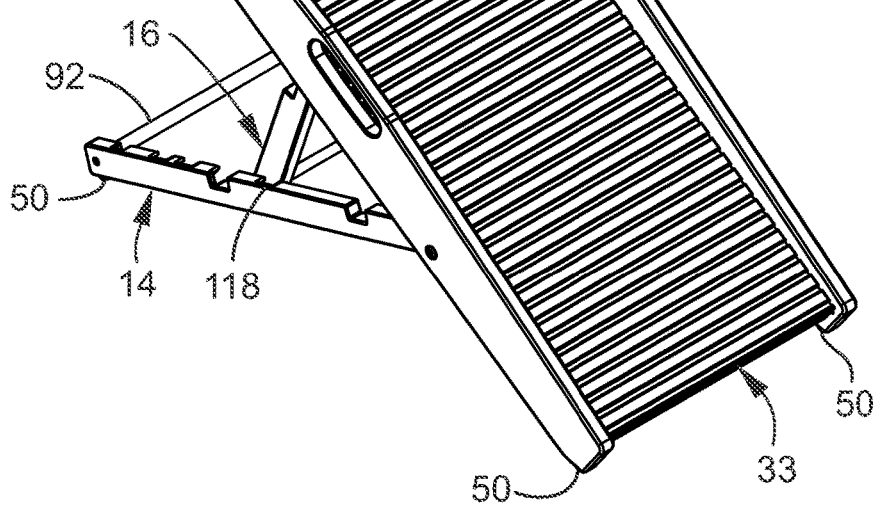
FIG. 6B is a front perspective view of the pet ramp apparatus of FIG. 1 where the slope of the ramp is at its greatest degree and is greater than the slope shown in FIG. 6A.

FIG. 6B shows that the outer ends 82 of the end support member 66 are set or engaged in oblique receptors or oblique receptor slots 118 of the base 14.

In FIGS. 5A, 5B, 6A, and 6B, the weight of the ramp 12 keeps the outer ends 82 engaged in the oblique receptors 118, 120, 122, 124. Since the support 16 is oblique to the horizontal when the pet ramp apparatus 10 is in the operational folded out form, receptors 118, 120, 122, 124 are oblique to the horizontal when the pet ramp apparatus 10 is in the operational folded out form. The axis of each of the receptors 118, 120, 122, 124 is generally parallel to the support side members 62, 64. Each of the support side members 62, 64 includes an axis and the oblique receptors 118, 120, 122, 124 have an axis that oblique to the axis of the support side members 62, 64.

In each of FIGS. 5A, 5B, 6A, and 6B, the pet ramp apparatus 10 rests or engages the surface on which it stands at four locations. Such locations are the two feet 50 at the outer end portions of the lower end 33 of the ramp 12 and the two feet 50 at the ends of the base side members 88, 90.

In FIG. 6B, ramp 12 has the first greatest angle of climb or descent. In FIG. 6A, ramp 12 has the second greatest angle of climb or descent. In FIG. 5B, ramp 12 has the third greatest angle of climb or descent. In FIG. 5A, ramp 12 has the fourth greatest angle of climb or descent. In other words, in FIG. 5A, ramp 12 has the smallest angle of climb or descent.

Figure 7A:
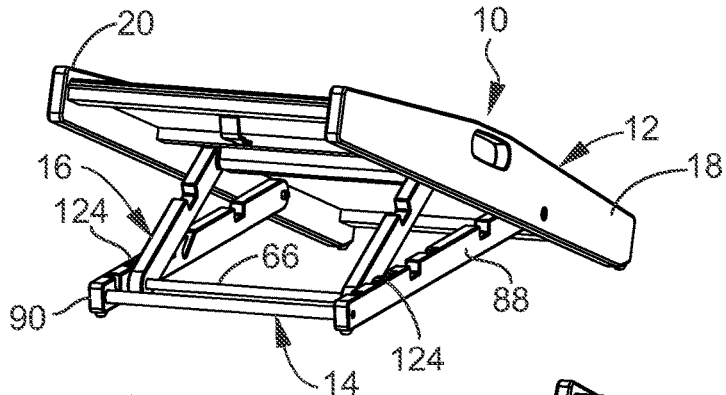
FIG. 7A is a rear perspective view of the pet ramp apparatus of FIG. 1 where the slope of the ramp is at its minimum degree.

FIG. 7A shows that the outer ends 82 of the end support member 66 are set or engaged in oblique receptors or oblique receptor slots 124 of the base 14.

Figure 7B:
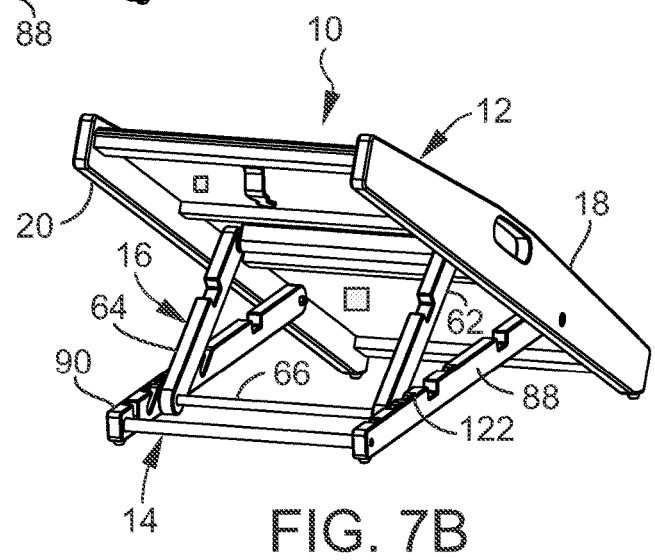
FIG. 7B is a rear perspective view of the pet ramp apparatus of FIG. 1 where the slope of the ramp is at an intermediate degree and is greater than the slope shown in FIG. 7A.

FIG. 7B shows that the outer ends 82 of the end support member 66 are set or engaged in oblique receptors or oblique receptor slots 122 of the base 14.

Figure 7C:
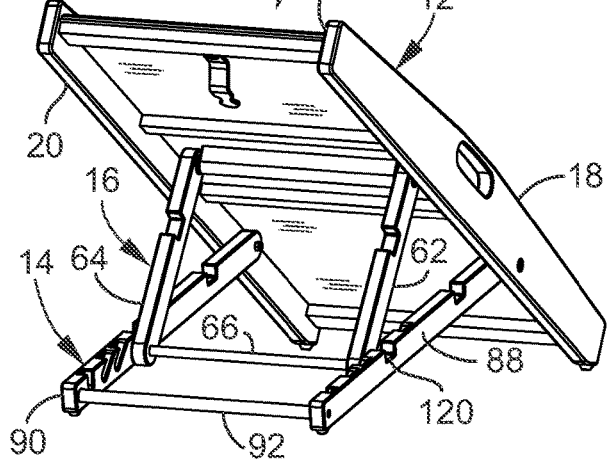
FIG. 7C is a rear perspective view of the pet ramp apparatus of FIG. 1 where the slope of the ramp is at an intermediate degree and is greater than the slope shown in FIG. 7B.

FIG. 7C shows that the outer ends 82 of the end support member 66 are set or engaged in oblique receptors or oblique receptor slots 120 of the base 14.

Figure 7D:
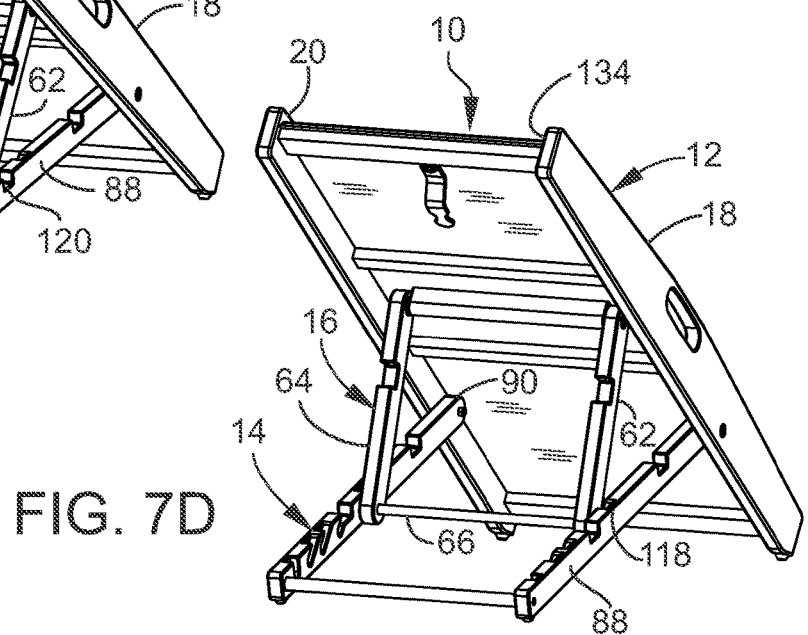
FIG. 7D is a rear perspective view of the pet ramp apparatus of FIG. 1 where the slope of the ramp is at its greatest degree and is greater than the slope shown in FIG. 7C.

FIG. 7D shows that the outer ends 82 of the end support member 66 are set or engaged in oblique receptors or oblique receptor slots 118 of the base 14.

In FIG. 7D, ramp 12 has the first greatest angle of climb or descent. In FIG. 7C, ramp 12 has the second greatest angle of climb or descent. In FIG. 7B, ramp 12 has the third greatest angle of climb or descent. In FIG. 7A, ramp 12 has the fourth greatest angle of climb or descent.

FIGS. 7A, 7B, 7C, and 7D show that the support 16 is disposed inwardly of the base 14 that in turn is disposed inwardly of the ramp side members 18, 20.

FIGS. 8A, 8B, 9A, and 9B show a section view of the pet ramp apparatus 10 in four states of the operational folded out form with the ramp 12 at different slopes. The slope rises in degree from FIG. 8A to FIG. 8B to FIG. 9A to FIG. 9B.

Figure 8A:
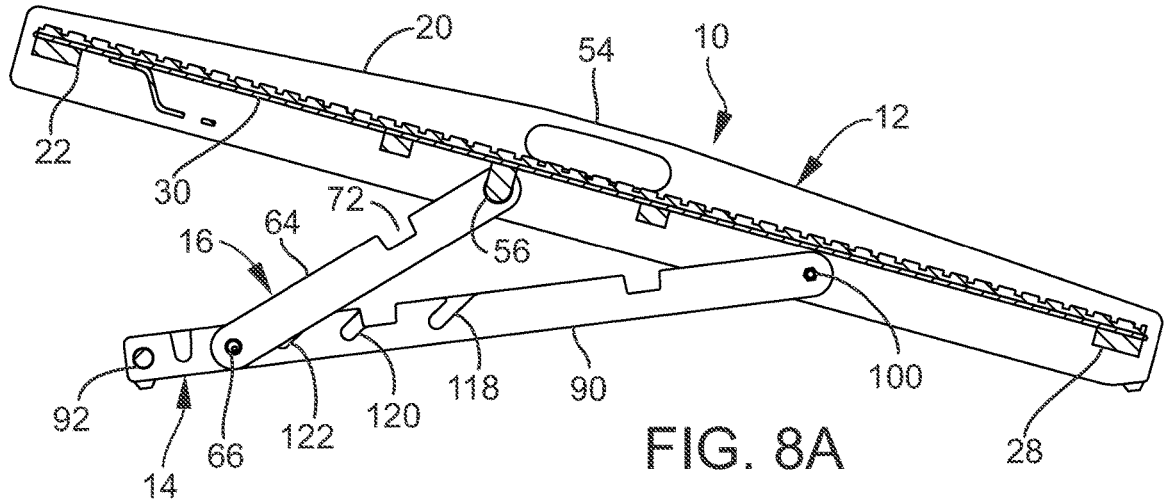
FIG. 8A is a side view of the pet ramp apparatus of FIG. 1 where the slope of the ramp is at its minimum degree.

FIG. 8A shows, by the process of elimination, that the outer ends 82 of the end support member 66 are set or engaged in oblique receptors or oblique receptor slots 124 of the base 14.

Figure 8B:
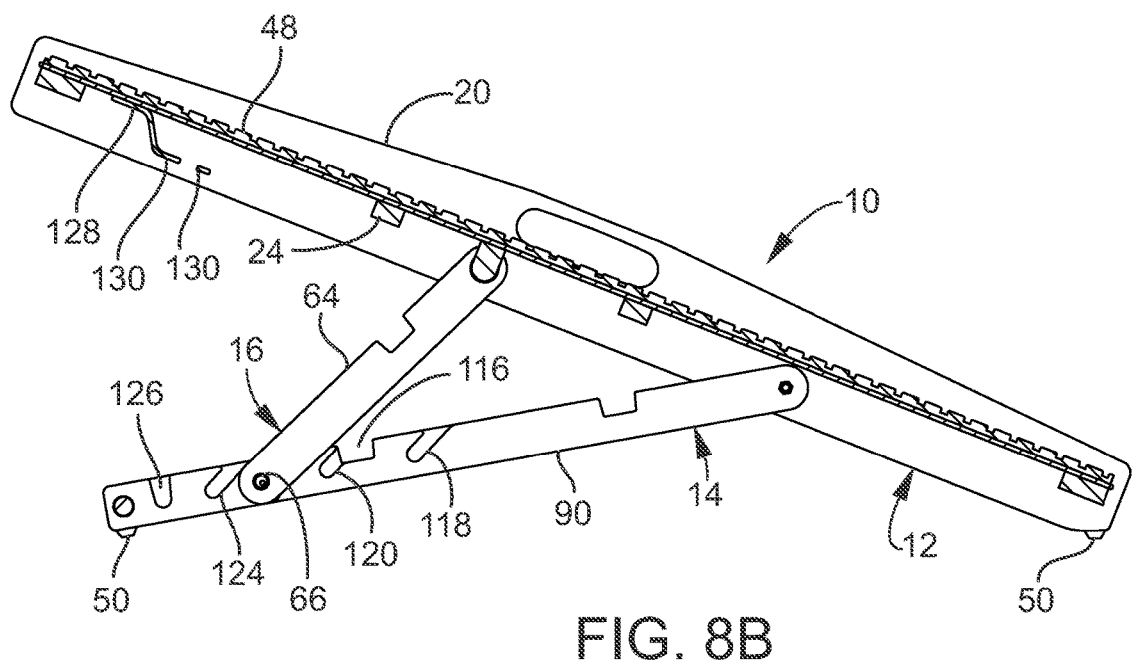
FIG. 8B is a side view of the pet ramp apparatus of FIG. 1 where the slope of the ramp is at an intermediate degree and is greater than the slope shown in FIG. 8A.

FIG. 8B shows, by the process of elimination, that the outer ends 82 of the end support member 66 are set or engaged in oblique receptors or oblique receptor slots 122 of the base 14.

Figure 9A:
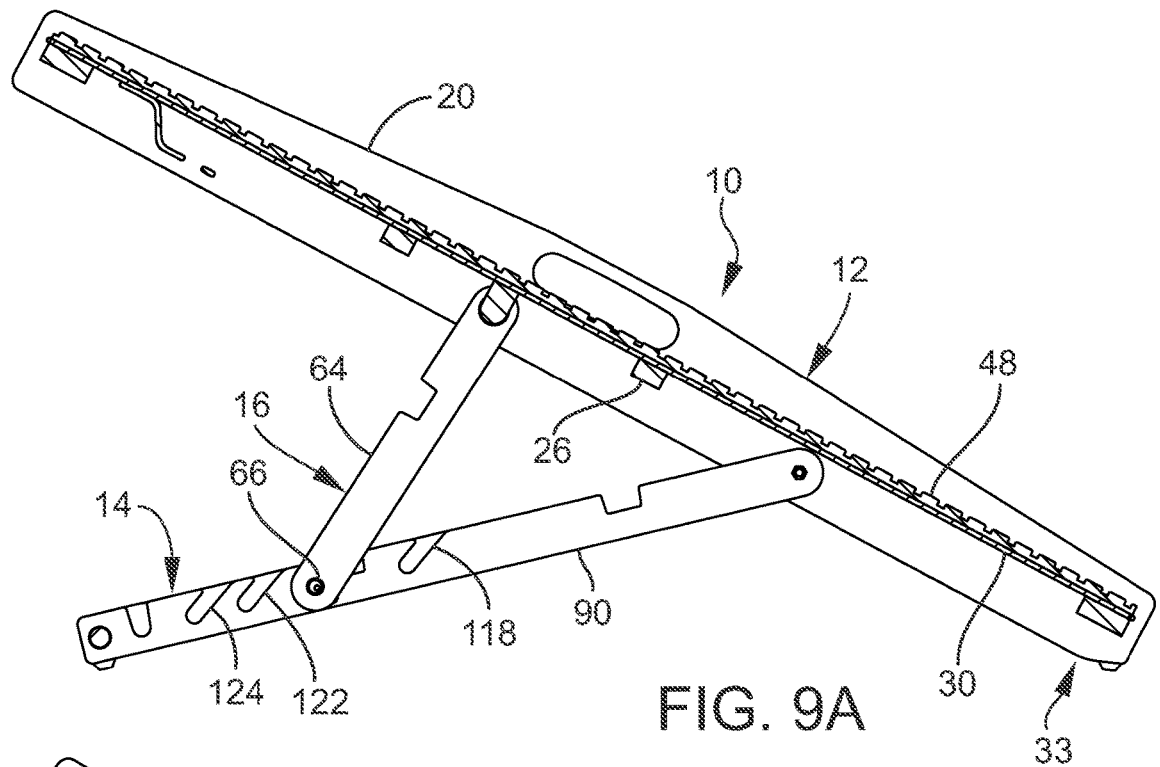
FIG. 9A is a side view of the pet ramp apparatus of FIG. 1 where the slope of the ramp is at an intermediate degree and is greater than the slope shown in FIG. 8B.

FIG. 9A shows, by the process of elimination, that the outer ends 82 of the end support member 66 are set or engaged in oblique receptors or oblique receptor slots 120 of the base 14.

Figure 9B:
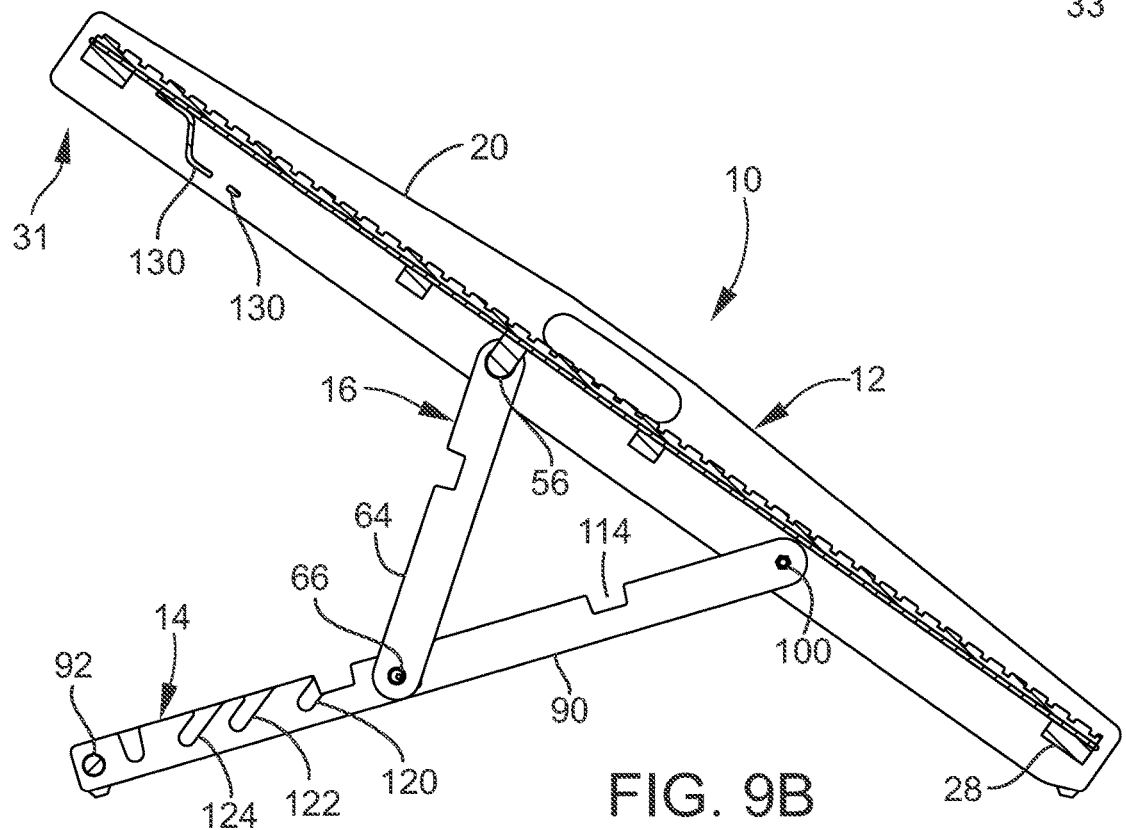
FIG. 9B is a side view of the pet ramp apparatus of FIG. 1 where the slope of the ramp is at its greatest degree and is greater than the slope shown in FIG. 9A.

FIG. 9B shows, by the process of elimination, that the outer ends 82 of the end support member 66 are set or engaged in oblique receptors or oblique receptor slots 118 of the base 14.

Figure 10A:
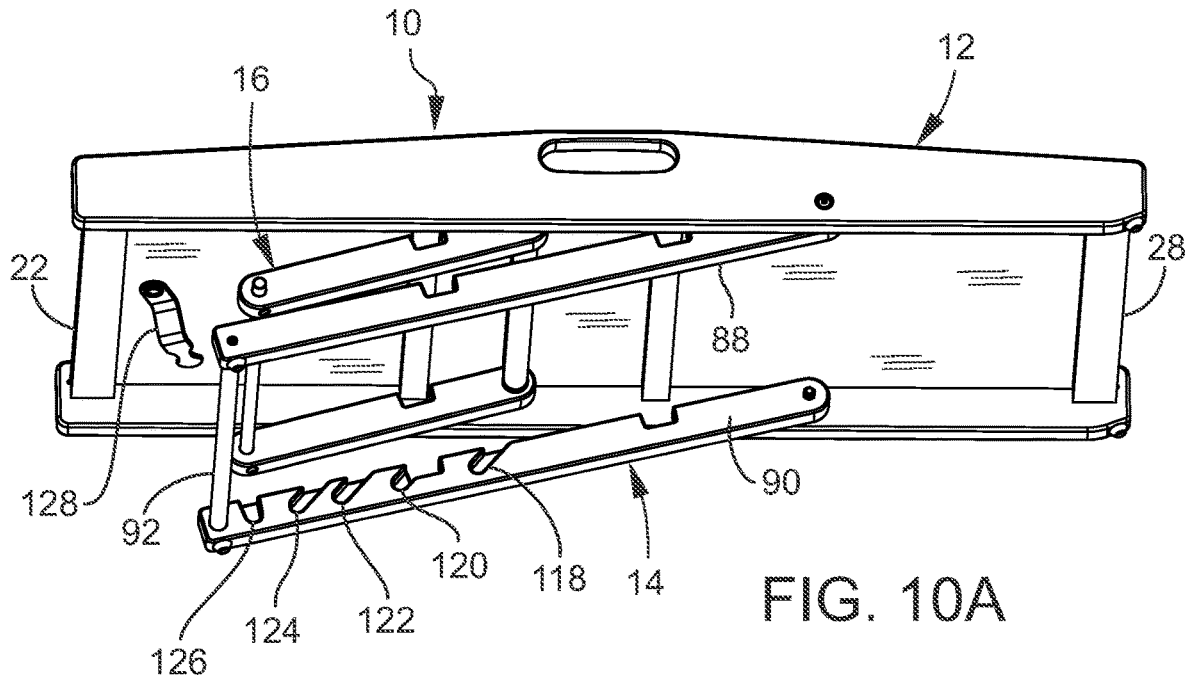
FIG. 10A is a bottom perspective view of the pet ramp apparatus of FIG. 1 in the process of being folded in from an operational folded out form to a compact folded in form for storage.
Figure 10B:
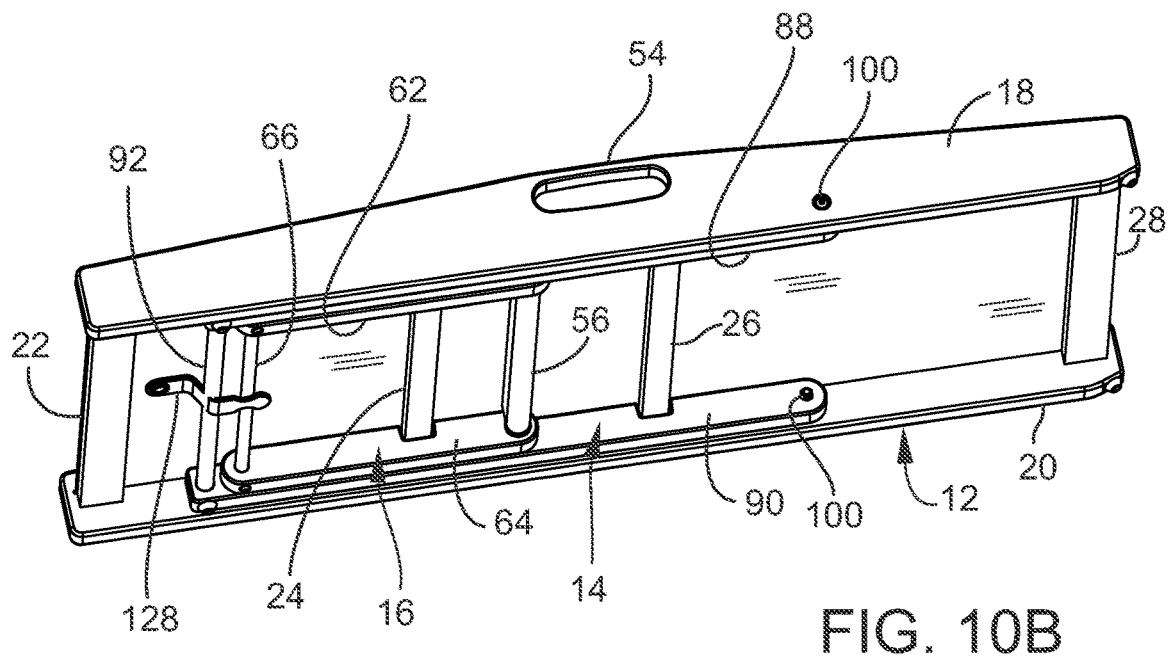
FIG. 10B is a bottom perspective view of the pet ramp apparatus of FIG. 1 having been completely folded in to its compact folded in form.

FIG. 10A shows the pet ramp apparatus 10 in the process of being folded from the compact folded in position to the operational folded out position. FIG. 10A may also be described as showing the pet ramp apparatus 10 in the process of being folded from the operational folded out position to the compact folded in position.

FIG. 10B shows the compact folded in position of the pet ramp apparatus 10. In such a position, end base member 92 and end support member 66 are adjacent to each other. The outer ends 82 of the end support member 66 are engaged in pocket or receptacle 126 of the base 14. End base member 92 and end support member 66 are engaged by the distal end portion 130 of the swinging lock 128. The axis of base side members 88, 90 are parallel to the axis of support side members 62, 64 that in turn are parallel to the plane of the piece or plate 30 when the pet ramp apparatus 10 is in the compact folded in position. Base side members 88, 90 define planes that are parallel to planes defined by support side members 62, 64 that in turn are parallel to planes defined by ramp side members 18, 20 when the pet ramp apparatus 10 is in the operational folded out position or in the compact folded in position. Base side members 88, 90, support side members 62, 64, and ramp side members 18, 20 all define planes that are disposed at a right angle to plate or piece 30 when the pet ramp apparatus 10 is in the operational folded out position or in the compact folded in position.

In the compact folded in position of FIG. 10B, the outermost structure (side members 62, 64) of the support 16 is adjacent to the outermost structure (side members 88, 90) of the base 14 that in turn is adjacent to the outermost structure (side members 18, 20) of the ramp 12, all of which are adjacent to the piece or plate 30. In the compact folded in position of FIG. 10B, transverse member 26 is received in notches or receptors 114 of base 14, transverse member 24 is received in receptors or notches 72 of support 14 and is also received in receptors or notches 116 of base 14, and end support member 66 is received in receptors or notches 126 of base 14. Laterally extending axes of notches 72 and 116 are aligned when the pet ramp apparatus 10 is in the compact folded in position such that, at the same time, notches 72 and 116 receive transverse member 24.

FIG. 11A is a side view of the pet ramp apparatus 10 in the compact and folded in position. FIG. 11A shows the periphery 32 having sequential periphery portions 34, 36, 38, 40, 42, 44, 46, and 34.

FIG. 11B shows a section view of the compact folded in position of FIG. 10B. Except for a small portion of feet 50 on the rear ends of base 14, FIG. 11B shows that the entire structures of the piece or plate 30, textile piece 48, base 14, and support 16 lie within the periphery 32.

Figure 12B:
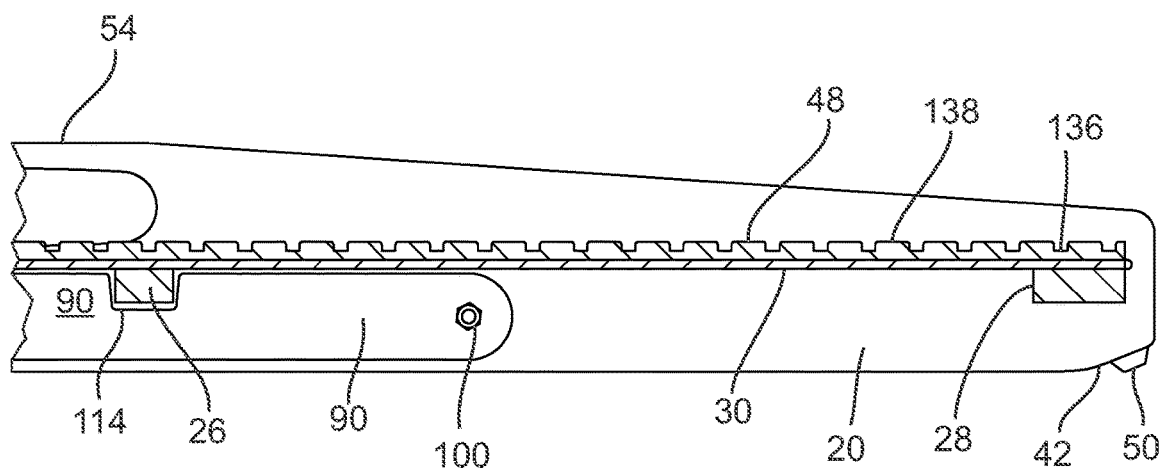
FIG. 12B is a detail view of the remaining portion of the pet ramp apparatus of FIG. 11B.

FIGS. 12A and 12B show detail views of FIG. 11B. FIGS. 12A and 12B show that the textile piece 48 includes a plurality of laterally extending channels 136 and a plurality of laterally extending ridges 138 between the channels. The ridges 138 have a flat top. The channels 136 have a flat bottom. The channels 136 are formed by side walls that extend at a right angle to piece or plate 30. Channels 136 and ridges 138 also extend at a right angle to ramp side members 18, 20.

FIGS. 13A and 13B show perspective isolated views of the base 14 that has been described above, where FIG. 13A is an exploded view and where FIG. 13B is an assembled view.

FIGS. 14A and 14B show perspective isolated views of the support 16 that has been described above, where FIG. 14A is an exploded view and where FIG. 14B is an assembled view.

In operation, the pet ramp apparatus 10 is shipped from the factory in the compact folded in state. The end user pulls out from the box the pet ramp apparatus 10 in the compact folded in state shown in FIG. 10B where the swinging lock 128 engages end base member 92 of base 14 and end support member 66 of support 16.

The end user may then position the pet ramp apparatus 10 adjacent to a sofa or to any other piece of furniture like a bed. Then the swinging lock 128 is swung to an out-of-the-way position such as to a position where the swinging lock 128 runs parallel to transverse support member 22. Then the base 14 and ramp 12 may be swung away from each other, such as by holding end base member 92 of the base 14 and pulling up on the upper end 31 of the ramp 12. While the base 14 and ramp 12 are held apart, the outer ends 82 of the end support member 66 of the support 16 are lifted out of notches or receptors 126, thereby swinging support 16 relative to ramp 12, and placed in preferably the closest receptors 124, whereby the outer ends 82 of the end support member 66 of the support 16 under the weight of the ramp 12 slide into the endmost portion of the receptors 124, and whereby the base 14, ramp 12, and support 16 may be released by the user since with such an engagement by the outer ends 82 the base 14, ramp 12, and support 16 self-support each other. Then, to increase the slope and height of the ramp 12, it is an easy task to lift the outer ends 82 from receptors 124 to receptors 122 or to receptors 120 or to receptors 118, with the slope of the ramp 12 increasing from engagement in receptors 124 to receptors 118. The preferred height and slope of the ramp 12 may be attained prior to or when the pet ramp apparatus 10 is adjacent to the sofa or bed or other furniture. Once located adjacent to the preferred piece of furniture, it is an easy matter for the pet to step up onto lower end 33 of the ramp 12 having the textile piece 48 and climbing up the textile piece 48 to the upper end 31 of the ramp 12, whereby the pet can step out onto the sofa cushions of the sofa or the sleeping surface of a bed or to an upper location of another piece of furniture. As the pet climbs up the ramp 12, the pet has guide rail 132 (FIG. 3) and opposing guide rail 134 (FIGS. 7C and 7D) as visual sight lines. These guide rails 132, 134 are the portions of ramp side members 18, 20 that rise above the textile piece 48. Slot 52 is formed in such portions 132, 134 and handles 54 are on these guide rails 132, 134. As the pet climbs the textile piece 48, the channels 136 and ridges 138 assist in the pet's climb without slippage because the channels 136 and ridges 138 are disposed at a right angle to the direction of travel.

When the pet is on the sofa or other piece of furniture, or when the pet is off the sofa or other piece of furniture, the pet ramp apparatus 10 may be left in place adjacent to the piece of furniture. Or the pet ramp apparatus 10 may be folded in to the compact folded in form and slid underneath the sofa or to another out-of-the-way location. Or the pet ramp apparatus 10 may be slid to an out-of-the-way location when in the operational folded out form.

From the sofa, the pet may climb onto the upper end 31 of the pet ramp 12 and then climb down the textile piece 48 to the lower end 33 of the ramp 12. This descent is safe for the pet because the pet has the sight lines or guide rails 132, 134 and because the channels 136 and ridges 138 are set at a right angle to the direction of travel from the upper end 31 of the ramp 12 to the lower end 33 of the ramp 12. Once the pet reaches the lower end 33 of the ramp 12, the pet may step out onto the floor or ground or other surface that the four feet 50 rest or stand upon.

To convert or fold the pet ramp apparatus 10 from the operational folded out form to the compact folded in form, the outer ends 82 of the end support member 66 are lifted out of the receptacles 124, 122, 120, or 118 and placed in receptacles 126. During this transfer from such receptacles 124, 122, 120, or 118 to receptacles 126, notches 114 of the base side members 88, 90 of base 14 receive transverse member 26 and notches 72, 116 of the support 16 and base 14 respectively receive transverse support member 24 such that base 14 and support 16 are disposed within the interior of the ramp 12, whereupon the swinging lock 128 may be swung from its out-of-the-way position parallel to transverse member 22 to an engagement position where the swinging lock 128 extends toward the lower end 33 of the ramp 12. In such a compact folded in position, the pet ramp apparatus 10 may be slid to a position of storage such as underneath a sofa or bed.

It should be noted that peripheral portion 42 of the ramp side members 18, 20 may be set at a right angle relative to peripheral portion 40 and in a straight line with peripheral portion 44 such that, effectively, no oblique corner portion 42 exists and such that corner portion 42 is essentially a continuation of peripheral portion 44. Foot 50 is still engaged to this alternate corner portion 42. In this alternate corner portion 42, such lower end of the side member 18, 20 is a mirror image of the upper end of the side member 18, 20 except that such lower end includes foot 50.

It should be noted that textile piece 48 may be glued or pinned or engaged to the upper surface of piece or plate 30 in another manner. Textile piece 48 runs the width and length of piece or plate 30 and piece or plate 30 runs the width and length of textile piece 48. In other words, textile piece 48 and piece or plate 30 have substantially the same width and substantially the same length.

It should be noted that ramp 12 and its components, such as the side members 18, 20, transverse members 22, 24, 26, and 28, transverse piece 56, piece or plate 30, are formed of wood or a wood product.

It should be noted that base 14 and its components, such as side members 88, 90, and end member 92, are formed of wood or a wood product.

It should be noted that support 16 and side members 62, 64 are formed of wood or wood products.

It should be noted that end member 66 of the support 16, including outer ends 82 of the end member 66, is preferably formed of a metal. However, if desired, end member 66 and its outer ends 82 may be formed of a wood or wood product.

It should be noted that in the compact folded in position, side members 18, 20 of the ramp 12 are spaced from their respective adjacent side members 88, 90 of the base 14, which in turn are spaced from their respective adjacent side members 62, 64 of the support 16. Such spacing allows for easy swing out and easy swing in, respectively, when the pet ramp apparatus 10 is folded from the compact folded in position to the operational folded out position and folded from the operational folded out position to the compact folded in position. Such spacing is provided at least in part by the washers 104 and the length of the transverse piece 56.

It should be noted that, when outer ends 82 are in any one of the receptacles or receivers or notches 118, 120, 122, 124, or 126, the outer faces of the outer ends 82 may limit lateral or transverse movement. A further limiter of transverse movement when the outer ends 82 are engaged in such receptacles or receivers or notches 118, 120, 122, 124, or 126, are the outer faces of the lower ends of the side members 62, 64 of the support 14 abutting the inner faces of their adjacent side members 88, 90 of the base 12. Thus, the support 16 has minimal, if any, side to side movement when the pet ramp apparatus 10 is in the operational folded out position.

It should be noted that the swing axis of the base 14 relative to the ramp 12 is parallel to the swing axis of the support 16 relative to the base 12.

It should be noted that, from a side view, when the pet ramp apparatus 10 is in the operational folded out position, the axis of side member 88 of the base 14, the lower edge of side member 18 of the ramp 12, and the surface on which the pet ramp apparatus 10 rests, form a triangle. Such can be seen in any of FIGS. 8A, 8B, 9A, and 9B.

It should be noted that, from a side view, when the pet ramp apparatus 10 is in the operational folded out position, the axis of side member 62 of support 16, the axis of side member 88 of base 14, and the lower edge of side member 18 of the ramp 12, form a triangle. Such can be seen in any of FIGS. 8A, 8B, 9A, and 9B.

It should be noted that textile piece 48 may be formed of a plastic, polymer, or other fiber. The fiber may be a natural fiber or a synthetic fiber. When a finger presses upon textile piece 48 and then the finger is released, the textile fibers spring back resiliently.

It should be noted that swinging lock 128 is preferably formed of a metal. However, the swinging lock 128 may be formed of a wood or wood product if desired.

It should be noted that, for each different slope of ramp 12, there is a different height to the upper ramp end 31.

It should be noted that, for each different height of the upper ramp end 31, there is a different slope.

It should be noted that the greater the height of upper ramp end 31, the greater the slope of ramp 12.

It should be noted that the present pet ramp apparatus 10 is not just limited to a couch. The pet ramp apparatus 10 may also be used by a pet for getting on and off a bed.

The pet ramp apparatus 10 may be used for small type dogs, medium sized dogs, or larger dogs. For smaller dogs, couches and/or beds may be too high of a surface for them to jump off. They may be hesitant to jump or afraid to jump. They may risk injury with such a higher jump.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalents of the claims are intended to be embraced therein.

What is claimed is:

1. A pet ramp apparatus between a surface and a location such that a pet may climb from the surface to the location and descend from the location to the surface, the surface and location being disposed at different heights, the pet ramp comprising:
   a) a base, the base having a first base end and a second base end, the first base end being disposable on the surface, the base having spaced apart support receptors;
   b) a ramp, the ramp having a first ramp end and a second ramp end, the first ramp end being disposable on the surface, the second ramp end being disposable at the location, the ramp being swingably engaged to the base;
   c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and
   d) wherein the ramp includes an interior, and wherein, after the support is removably engaged from the base, each of the base and support are swingable into the interior of the ramp.

2. The pet ramp apparatus of claim 1, wherein the second base end is swingably engaged to the ramp.

3. The pet ramp apparatus of claim 1, wherein the second support end is swingably engaged to the ramp.

4. The pet ramp apparatus of claim 1, wherein the ramp includes a direction of travel from the first ramp end to the second ramp end, wherein the ramp further includes transverse members extending transversely relative to the direction of travel, and wherein the base includes a transverse member receptor for receiving one of the transverse members when the base, support, and ramp are swung together.

5. The pet ramp apparatus of claim 1, wherein the support includes a transverse member receptor for receiving one of the transverse members when the base, support, and ramp are swung together.

6. The pet ramp apparatus of claim 1, wherein the base includes first and second side base members and an end base member engaged between the first and second side base members, each of the first and second side base members being swingably engaged to the ramp, the first and second side base members including the spaced apart support receptors, each of the spaced apart support receptors of the first side base member being matched with and transversely opposing a spaced apart support receptor of the second side base member.

7. The pet ramp apparatus of claim 1, wherein the base is swingably engaged to the ramp between the first ramp end and the second ramp end.

8. The pet ramp apparatus of claim 1, wherein when the pet ramp apparatus is in use between the surface and the location the base makes contact with the surface at two locations and all other portions of the base are spaced from the surface, wherein when the pet ramp apparatus is in use between the surface and the location the ramp makes contact with the surface at two locations and all other portions of the ramp are spaced from the surface, and wherein when the pet ramp apparatus is in use between the surface and the location all portions of the support are spaced from the surface.

9. A pet ramp apparatus between a surface and a location such that a pet may climb from the surface to the location and descend from the location to the surface, the surface and location being disposed at different heights, the pet ramp comprising:
   a) a base, the base having a first base end and a second base end, the first base end being disposable on the surface, the base having spaced apart support receptors;
   b) a ramp, the ramp having a first ramp end and a second ramp end, the first ramp end being disposable on the surface, the second ramp end being disposable at the location, the ramp being swingably engaged to the base;
   c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and
   d) wherein the first support end is removably engagable in each of the spaced apart support receptors of the base.

10. A pet ramp apparatus between a surface and a location such that a pet may climb from the surface to the location and descend from the location to the surface, the surface and location being disposed at different heights, the pet ramp comprising:
   a) a base, the base having a first base end and a second base end, the first base end being disposable on the surface, the base having spaced apart support receptors;
   b) a ramp, the ramp having a first ramp end and a second ramp end, the first ramp end being disposable on the surface, the second ramp end being disposable at the location, the ramp being swingably engaged to the base;
   c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and d) wherein the base includes an axis, and wherein at least two of said spaced apart support receptors are disposed at an oblique angle relative to the axis of the base.

11. A pet ramp apparatus between a surface and a location such that a pet may climb from the surface to the location and descend from the location to the surface, the surface and location being disposed at different heights, the pet ramp comprising:

a) a base, the base having a first base end and a second base end, the first base end being disposable on the surface, the base having spaced apart support receptors;

b) a ramp, the ramp having a first ramp end and a second ramp end, the first ramp end being disposable on the surface, the second ramp end being disposable at the location, the ramp being swingably engaged to the base;

c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and d) wherein, when the support is engaged to one of the spaced apart support receptors that is disposed obliquely relative to an axis of the base, the base and ramp are disposed obliquely relative to each other.

12. A pet ramp apparatus between a surface and a location such that a pet may climb from the surface to the location and descend from the location to the surface, the surface and location being disposed at different heights, the pet ramp comprising:

a) a base, the base having a first base end and a second base end, the first base end being disposable on the surface, the base having spaced apart support receptors;

b) a ramp, the ramp having a first ramp end and a second ramp end, the first ramp end being disposable on the surface, the second ramp end being disposable at the location, the ramp being swingably engaged to the base;

c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and d) wherein the base includes first and second side base members and an end base member engaged between the first and second side base members, each of the first and second side base members being swingably engaged to the ramp, the first and second side base members including the spaced apart support receptors, each of the spaced apart support receptors defined by an upper opening, a closed outer wall, a side opening opposite of the closed outer wall, and a closed bottom end.

13. A pet ramp apparatus between a surface and a location such that a pet may climb from the surface to the location and descend from the location to the surface, the surface and location being disposed at different heights, the pet ramp comprising:

a) a base, the base having a first base end and a second base end, the first base end being disposable on the surface, the base having spaced apart support receptors;

b) a ramp, the ramp having a first ramp end and a second ramp end, the first ramp end being disposable on the surface, the second ramp end being disposable at the location, the ramp being swingably engaged to the base;

c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and d) wherein the base includes first and second side base members and an end base member engaged between the first and second side base members, each of the first and second side base members being swingably engaged to the ramp, each of the first and second side base members including a transverse member receptor for receiving one of the transverse members when the base, support, and ramp are swung together, and each of the transverse member receptors being defined by an upper opening, two side openings opposite of each other, and a closed bottom end.

14. A pet ramp apparatus between a surface and a location such that a pet may climb from the surface to the location and descend from the location to the surface, the surface and location being disposed at different heights, the pet ramp comprising:

a) a base, the base having a first base end and a second base end, the first base end being disposable on the surface, the base having spaced apart support receptors;

b) a ramp, the ramp having a first ramp end and a second ramp end, the first ramp end being disposable on the surface, the second ramp end being disposable at the location, the ramp being swingably engaged to the base;

c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and d) wherein the support includes first and second side support members and an end support member, each of the first and second side support members including a transverse member receptor for receiving one of the transverse members when the base, support, and ramp are swung together.

15. A pet ramp apparatus between a surface and a location such that a pet may climb from the surface to the location and descend from the location to the surface, the surface and location being disposed at different heights, the pet ramp comprising:

a) a base, the base having a first base end and a second base end, the first base end being disposable on the surface, the base having spaced apart support receptors;

b) a ramp, the ramp having a first ramp end and a second ramp end, the first ramp end being disposable on the surface, the second ramp end being disposable at the location, the ramp being swingably engaged to the base;
c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and
d) wherein the support includes first and second side support members and an end support member, each of the first and second side support members being disposed inwardly of outermost sidewalls of the ramp, and each of the first and second side support members being disposed inwardly of outermost side base members of the base.

16. A pet ramp apparatus between a surface and a location such that a pet may climb from the surface to the location and descend from the location to the surface, the surface and location being disposed at different heights, the pet ramp comprising:
a) a base, the base having a first base end and a second base end, the first base end being disposable on the surface, the base having spaced apart support receptors;
b) a ramp, the ramp having a first ramp end and a second ramp end, the first ramp end being disposable on the surface, the second ramp end being disposable at the location, the ramp being swingably engaged to the base;
c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and
d) wherein the support includes first and second side support members and an end support member, wherein the end support member includes first and second opposing ends, the first opposing end extending outwardly of an outermost side surface of the first side support member, the second opposing end extending outwardly of an outermost side surface of the second side support member, and each of the first and second opposing ends engaging one of the spaced apart support receptors.

17. A pet ramp apparatus between a surface and a location such that a pet may climb from the surface to the location and descend from the location to the surface, the surface and location being disposed at different heights, the pet ramp comprising:
a) a base, the base having a first base end and a second base end, the first base end being disposable on the surface, the base having spaced apart support receptors;
b) a ramp, the ramp having a first ramp end and a second ramp end, the first ramp end being disposable on the surface, the second ramp end being disposable at the location, the ramp being swingably engaged to the base;
c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and
d) wherein the support includes first and second side support members and an end support member, wherein each of the first and second side support members is swingably engaged to a transverse piece on the ramp, the transverse piece being disposed transversely relative to a direction of travel from the first ramp end to the second ramp end, the transverse piece having first and second ends that terminate short of outermost sides of the ramp, the first side support member being swingably engaged to the first end of the transverse piece, the second side support member being swingably engaged to the second end of the transverse piece.

18. A pet ramp apparatus between a surface and a location such that a pet may climb from the surface to the location and descend from the location to the surface, the surface and location being disposed at different heights, the pet ramp comprising:
a) a base, the base having a first base end and a second base end, the first base end being disposable on the surface, the base having spaced apart support receptors;
b) a ramp, the ramp having a first ramp end and a second ramp end, the first ramp end being disposable on the surface, the second ramp end being disposable at the location, the ramp being swingably engaged to the base;
c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and
d) wherein the ramp includes first and second side members and a ramp plate between the first and second side members, the first side member including a first periphery, the second side member including a second periphery, the ramp plate engaged to a first innermost side of the first side member within said first periphery, the ramp plate engaged to a second innermost side of the second side member within said second periphery.

19. A pet ramp apparatus between a surface and a location such that a pet may climb from the surface to the location and descend from the location to the surface, the surface and location being disposed at different heights, the pet ramp comprising:
a) a base, the base having a first base end and a second base end, the first base end being disposable on the surface, the base having spaced apart support receptors;
b) a ramp, the ramp having a first ramp end and a second ramp end, the first ramp end being disposable on the surface, the second ramp end being disposable at the location, the ramp being swingably engaged to the base;
c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and
d) wherein the ramp includes first and second side members and a ramp plate between the first and second side members, and further including a set of transverse members engaged between the first and second side members, the ramp plate being on each of the transverse members.

20. A pet ramp apparatus between a surface and a location such that a pet may climb from the surface to the location and descend from the location to the surface, the surface and location being disposed at different heights, the pet ramp comprising:
   a) a base, the base having a first base end and a second base end, the first base end being disposable on the surface, the base having spaced apart support receptors;
   b) a ramp, the ramp having a first ramp end and a second ramp end, the first ramp end being disposable on the surface, the second ramp end being disposable at the location, the ramp being swingably engaged to the base;
   c) a support between the base and the ramp, the support having a first support end and a second support end, the support being swingably engaged to the ramp, the support being removably engagable to the base at each of the spaced apart support receptors, and each of the spaced apart support receptors providing a different angle of the ramp relative to the base when the support is engaged in said spaced apart support receptor; and
   d) wherein the support includes first and second side support members and an end support member engaged between the first and second side support members, wherein the base includes first and second side base members and an end base member engaged between the first and second side base members, wherein the ramp includes first and second side outermost members, wherein the first and second side base members of the base are disposed inwardly of first and second outermost members of the ramp, wherein the first and second side support members of the support are disposed inwardly of first and second side base members of the base.

* * * * *